(12) United States Patent
Tatsutani et al.

(10) Patent No.: US 10,723,552 B2
(45) Date of Patent: Jul. 28, 2020

(54) SAMPLE MEASUREMENT SYSTEM AND METHOD OF TRANSPORTING IN AND OUT RACK

(71) Applicant: SYSMEX CORPORATION, Kobe-shi, Hyogo (JP)

(72) Inventors: Hiroo Tatsutani, Kobe (JP); Yuichiro Ohmae, Kobe (JP); Atsushi Kumagai, Kobe (JP)

(73) Assignee: SYSMEX CORPORATION, Kobe-shi (JP)

( * ) Notice: Subject to any disclaimer, the term of this patent is extended or adjusted under 35 U.S.C. 154(b) by 230 days.

(21) Appl. No.: 15/704,423

(22) Filed: Sep. 14, 2017

(65) Prior Publication Data

US 2018/0002108 A1 Jan. 4, 2018

Related U.S. Application Data

(63) Continuation of application No. PCT/JP2016/058253, filed on Mar. 16, 2016.

(30) Foreign Application Priority Data

Mar. 18, 2015 (JP) ................................ 2015-054690

(51) Int. Cl.
    *B65G 1/04* (2006.01)
    *G01N 35/04* (2006.01)
    (Continued)

(52) U.S. Cl.
    CPC ................. *B65G 1/04* (2013.01); *B01L 9/06* (2013.01); *B65G 1/026* (2013.01);
    (Continued)

(58) Field of Classification Search
    CPC . G01N 35/026; G01N 2035/0462; B65G 1/04
    See application file for complete search history.

(56) References Cited

U.S. PATENT DOCUMENTS

| 5,232,081 A | 8/1993 | Kanamori |
| 7,331,474 B2* | 2/2008 | Veiner .................... G01N 35/04 |
| | | 211/74 |

(Continued)

FOREIGN PATENT DOCUMENTS

| CN | 101358987 A | 2/2009 |
| CN | 102023224 A | 4/2011 |

(Continued)

OTHER PUBLICATIONS

Chinese Office Action (CNOA) dated Apr. 24, 2019 in a counterpart Chinese patent application.

(Continued)

*Primary Examiner* — Jonathan Snelting
(74) *Attorney, Agent, or Firm* — Metrolex IP Law Group, PLLC

(57) ABSTRACT

A sample measurement system includes: a measurement unit that measures a sample stored in a sample container; a transport unit that transports a rack capable of holding sample containers via the measurement unit; a first transport-in/transport-out unit and a second transport-in/transport-out unit in each of which racks can be set alongside in a first direction, and that send the set racks to be transported to the measurement unit and receive the racks transported from the measurement unit; and a controller that controls the first transport-in/transport-out unit and the second transport-in/transport-out unit so that the racks are sequentially sent from the first transport-in/transport-out unit and the second transport-in/transport-out unit. The first transport-in/transport-out unit and the second transport-in/transport-out unit are disposed alongside in a second direction crossing the first direction, and each send the racks from one side in the first direction, and receive the racks from the other side.

10 Claims, 18 Drawing Sheets

(51) Int. Cl.
    *G01N 35/00*     (2006.01)
    *B01L 9/06*     (2006.01)
    *B65G 1/02*     (2006.01)
    *G01N 35/02*     (2006.01)

(52) U.S. Cl.
    CPC . *G01N 35/00732* (2013.01); *G01N 35/00871* (2013.01); *G01N 35/026* (2013.01); *G01N 35/04* (2013.01); *B01L 2200/18* (2013.01); *B65G 2201/0235* (2013.01); *G01N 2035/0415* (2013.01); *G01N 2035/0462* (2013.01); *G01N 2035/0465* (2013.01)

(56) References Cited

U.S. PATENT DOCUMENTS

| | | | | |
|---|---|---|---|---|
| 7,858,032 | B2* | 12/2010 | Le Comte | G01N 35/00594 422/65 |
| 7,939,020 | B2* | 5/2011 | Nogawa | G01N 35/026 422/63 |
| 9,310,389 | B2* | 4/2016 | Kitagawa | G01N 35/00613 |
| 2003/0235514 | A1 | 12/2003 | Nogawa et al. | |
| 2004/0208787 | A1* | 10/2004 | Takahashi | G01N 35/02 422/64 |
| 2005/0194333 | A1 | 9/2005 | Veiner et al. | |
| 2005/0287039 | A1* | 12/2005 | Matsubara | G01N 35/02 422/68.1 |
| 2011/0065193 | A1 | 3/2011 | Kitagawa et al. | |
| 2011/0076194 | A1 | 3/2011 | Kitagawa et al. | |

FOREIGN PATENT DOCUMENTS

| | | |
|---|---|---|
| CN | 103777029 A | 5/2014 |
| CN | 107076772 A | 8/2017 |
| EP | 2725361 A1 | 4/2014 |
| EP | 3239719 A1 | 11/2017 |
| JP | H04-131766 A | 5/1992 |
| JP | H06-034642 A | 2/1994 |
| JP | 2003-344423 A | 12/2003 |
| JP | 2007-527010 A | 9/2007 |
| JP | 2011-064537 A | 3/2011 |
| JP | 2011-075445 A | 4/2011 |

OTHER PUBLICATIONS

Chinese Office Action (CNOA) dated Nov. 6, 2019 in a counterpart Chinese patent application.
Office Action dated Apr. 13, 2020 in a counterpart Chinese patent application.

* cited by examiner

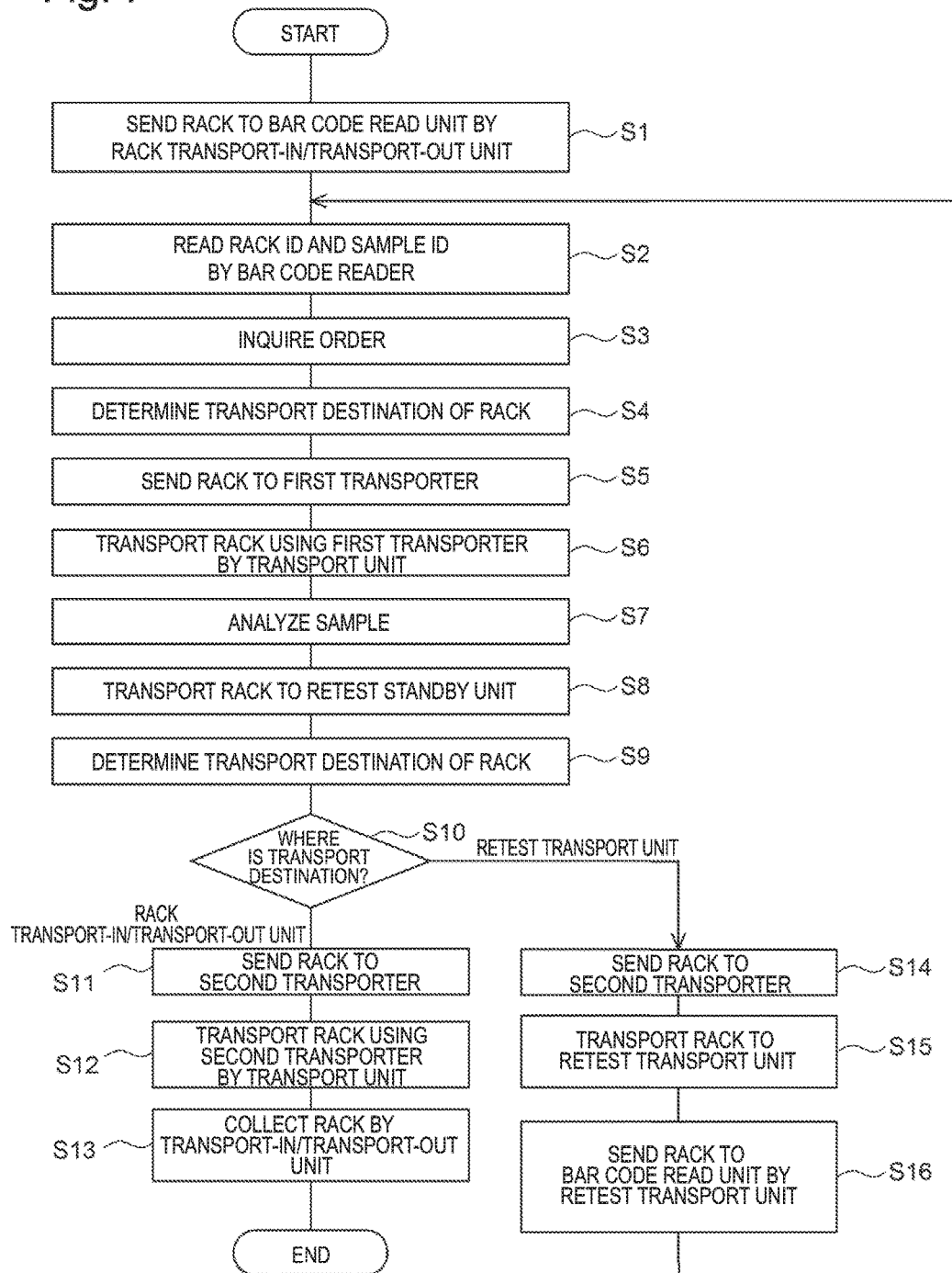

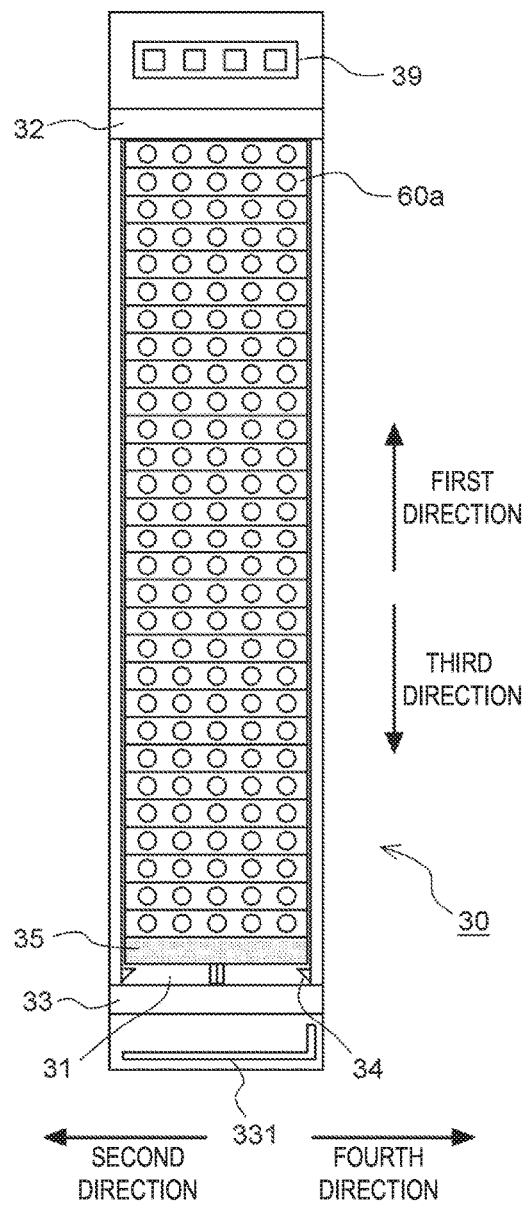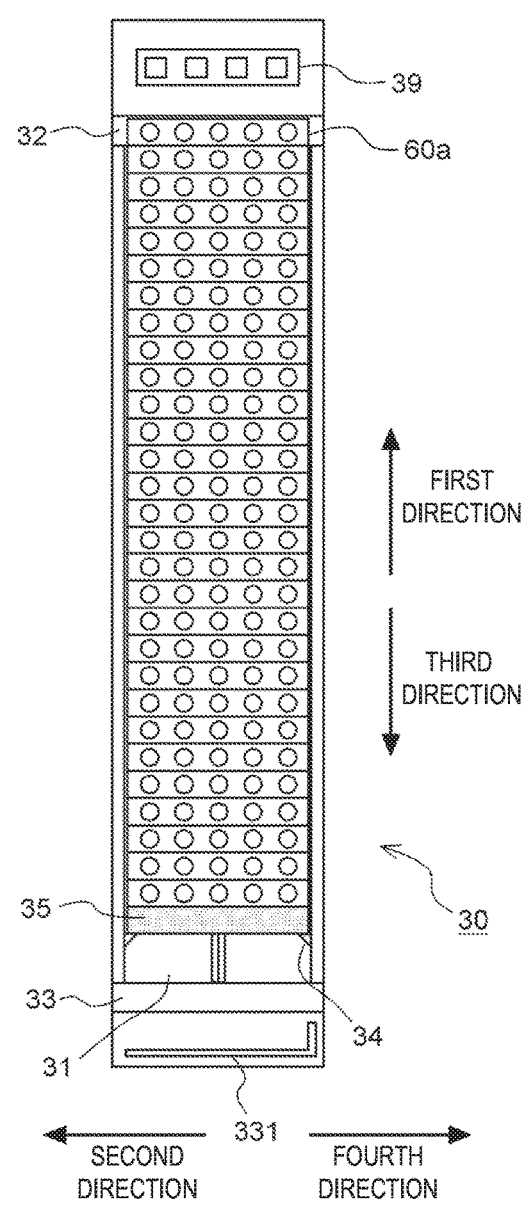

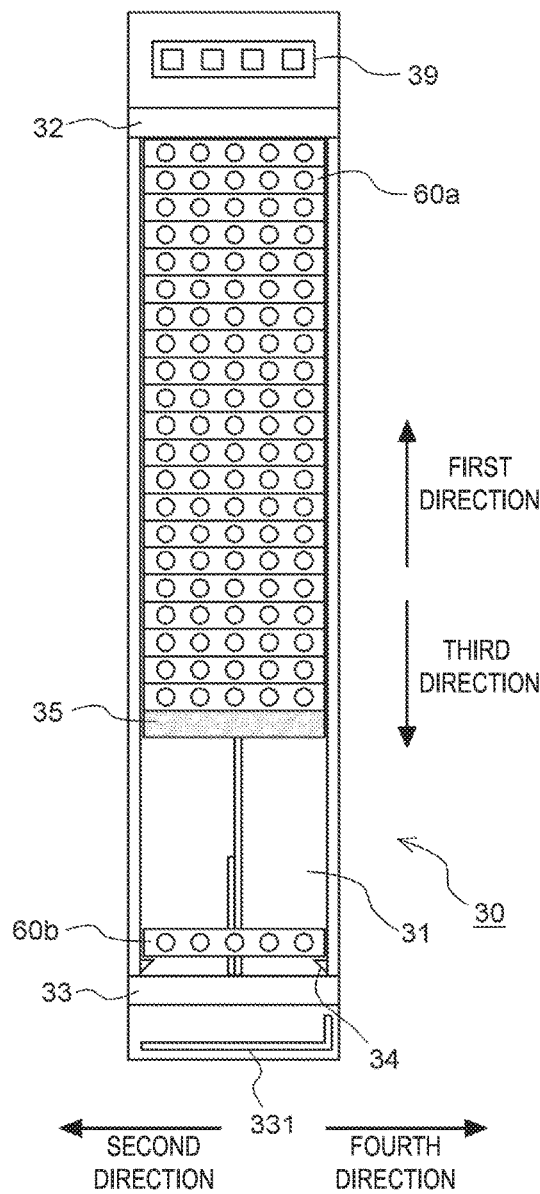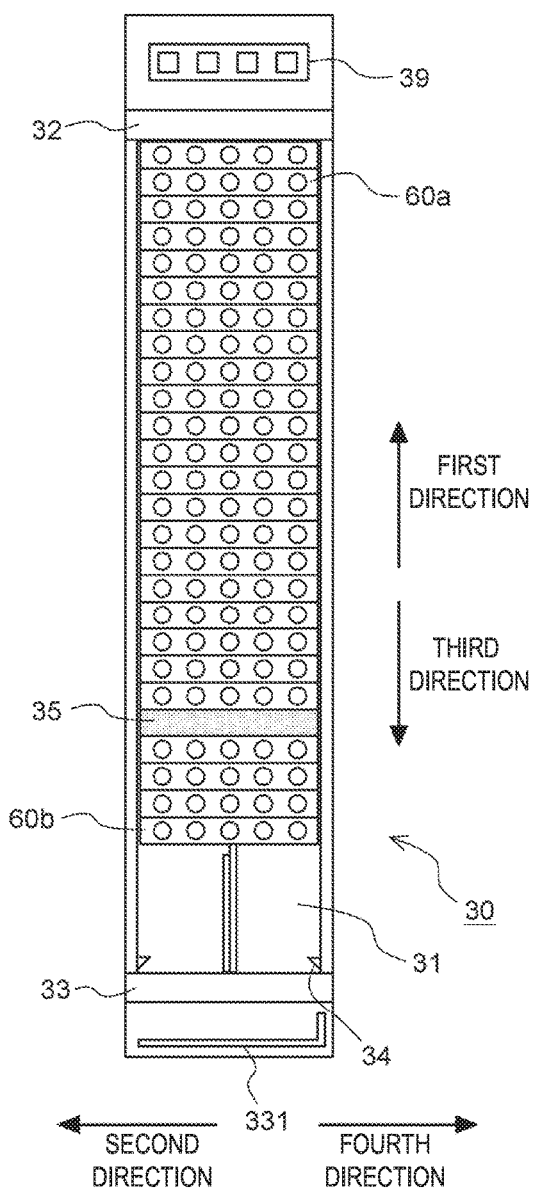

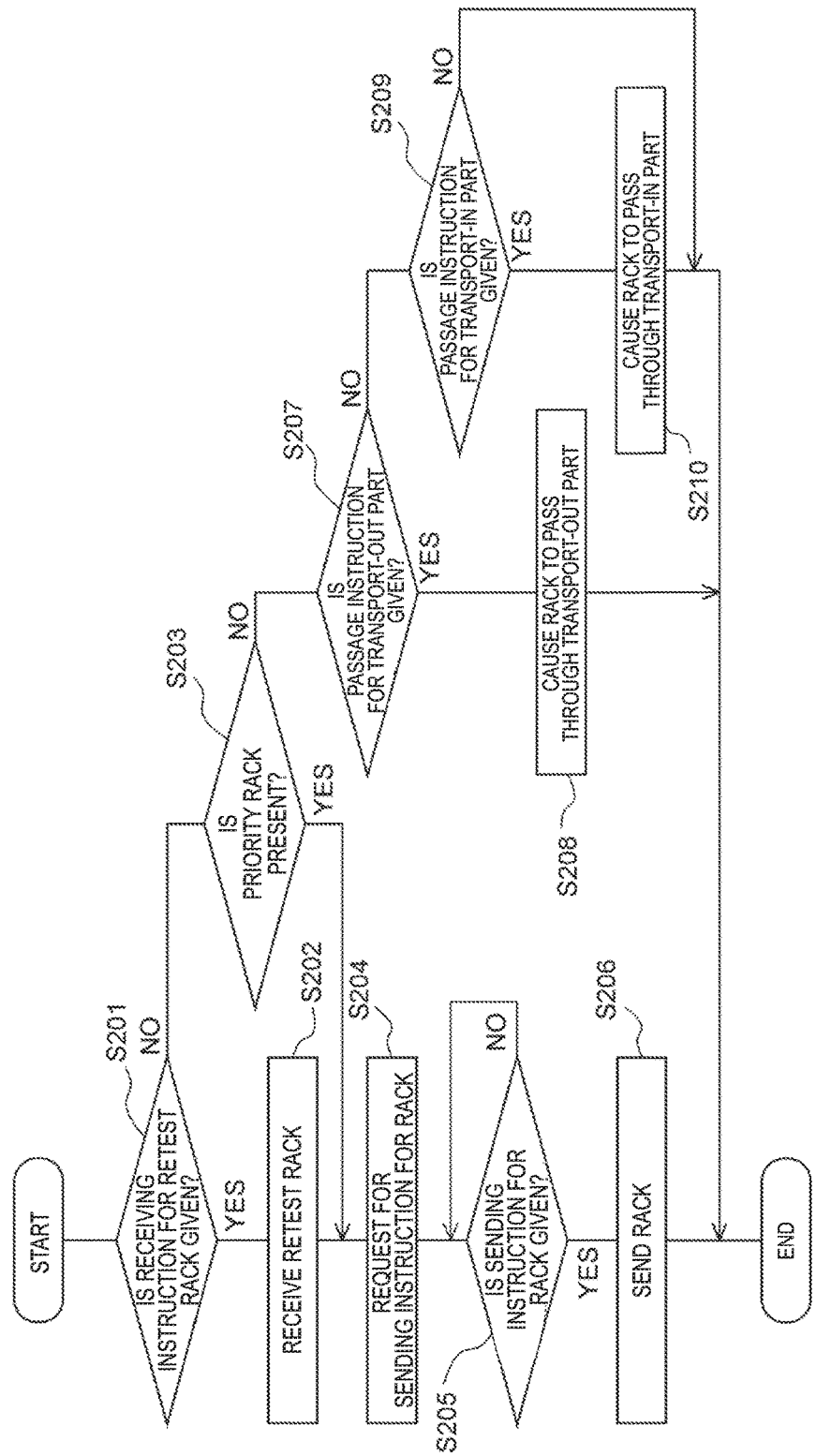

SAMPLE MEASUREMENT SYSTEM AND METHOD OF TRANSPORTING IN AND OUT RACK

CROSS REFERENCE TO RELATED APPLICATIONS

This application is a continuation application of International Application No. PCT/JP2016/058253, filed on Mar. 16, 2016, which claims priority based on the Article 8 of Patent Cooperation Treaty from prior Japanese Patent Application No. 2015-054690, filed on Mar. 18, 2015, the entire contents of which are incorporated herein by reference.

BACKGROUND

The disclosure relates to a sample measurement system and a method of transporting in and out a rack.

Japanese Patent Application Publication No. 2011-75445 (JP2011-75445A) discloses a sample processing system that includes a rack delivery unit that submits a rack holding a sample before measurement, and a rack collection unit that collects a rack holding a sample after measurement. In the sample processing system, multiple racks holding samples before measurement are arranged in a line, and placed on the rack delivery unit, and then the racks are delivered to a measurement unit. A rack holding samples for which measurement by the measurement unit is completed is transported to the rack collection unit. In the sample processing system, multiple rack collection units are provided so as to separately collect racks holding samples, for which measurement is completed.

SUMMARY

Some testing organizations demand that a great amount of samples be efficiently tested, and it is effective to increase the number of rack delivery units in the case of JP2011-75445A. In this case, not only multiple rack collection units but also multiple rack delivery units are also installed. Some testing organizations demand that an installation area be as small as possible, and desire efficient use of a limited area.

A sample measurement system according to one or more embodiments may include: a measurement unit that measures a sample stored in a sample container; a transport unit that transports a rack capable of holding sample containers via the measurement unit; a first transport-in/transport-out unit and a second transport-in/transport-out unit in each of which racks can be set alongside in a first direction, and that send the set racks to be transported to the measurement unit by the transport unit and receive the racks transported from the measurement unit by the transport unit; and a controller that controls the first transport-in/transport-out unit and the second transport-in/transport-out unit so that the racks are sequentially sent from the first transport-in/transport-out unit and the second transport-in/transport-out unit. The first transport-in/transport-out unit and the second transport-in/transport-out unit are disposed alongside in a second direction crossing the first direction, and each send the racks from one side in the first direction, and receive the racks from the other side.

A method of transporting in and out a rack, according to one or more embodiments, the method may include causing a first transport-in/transport-out unit and a second transport-in/transport-out unit in each of which racks each capable of holding sample containers can be set to send the racks and to receive racks transported via a measurement unit that measures samples. The method may further include: completing sending of the racks from the first transport-in/transport-out unit and the second transport-in/transport-out unit in this order; and receiving the racks by the first transport-in/transport-out unit and the second transport-in/transport-out unit in this order.

According to one or more embodiments, a limited area may be used efficiently.

BRIEF DESCRIPTION OF DRAWINGS

FIG. 7 is a flowchart illustrating operational steps of a measurement system;

FIG. 8A is a plan view illustrating setting of a rack in a transport-in/transport-out unit;

FIG. 8B is a plan view illustrating transfer of a rack in a transport-in/transport-out unit;

FIG. 8C is a plan view illustrating setting of a rack in a transport-in/transport-out unit;

FIG. 8D is a plan view illustrating setting of a rack in a transport-in/transport-out unit;

FIG. 10 is a flowchart illustrating operational steps of a retest transport unit;

DETAILED DESCRIPTION

Figure 1:
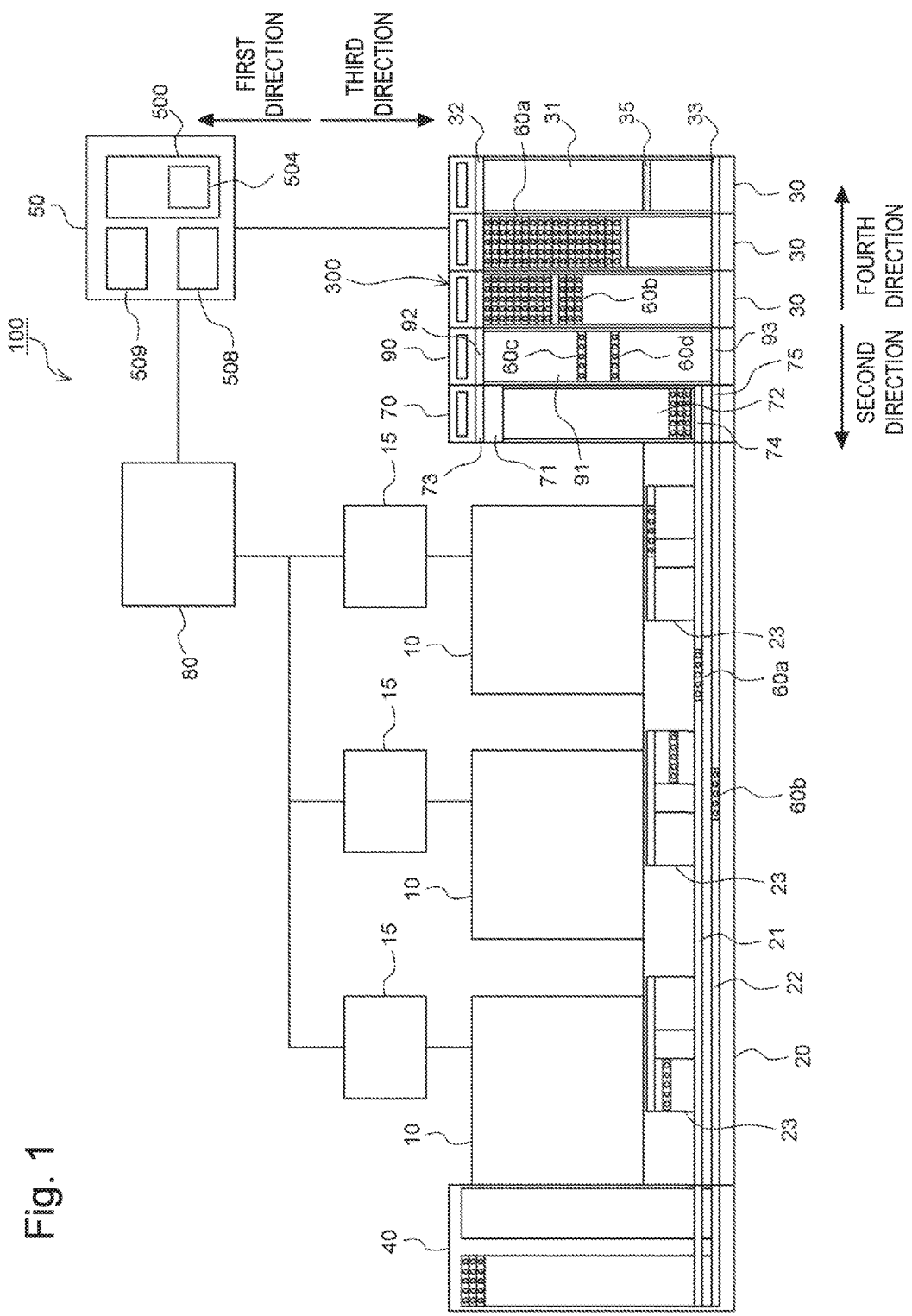
FIG. 1 is a plan view illustrating the configuration of a measurement system according to a first embodiment.

Hereinafter, embodiments are described with reference to the drawings.

First Embodiment

<Configuration of Sample Measurement System>

In this embodiment, a sample measurement system for measuring an antigen or an antibody included in a serum obtained from a subject is described.

The configuration of the sample measurement system is described with reference to FIG. 1. Sample measurement system 100 includes measurement unit 10, information process unit 15, transport unit 20, transport-in/transport-out unit 30, retest standby unit 40, and control unit 50.

Rack transport-in/transport-out device 300 includes multiple transport-in/transport-out units 30, one bar code read unit 70, and one retest transport unit 90. A user uses rack transport-in/transport-out device 300 to submit or load rack (hereinafter referred to as a "pre-measurement rack") 60a holding sample containers that store samples before measurement to sample measurement system 100. Also, a user uses rack transport-in/transport-out device 300 to collect or unload from sample measurement system 100 rack (hereinafter referred to as a "post-measurement rack") 60b holding sample containers that store samples after measurement. Rack transport-in/transport-out device 300 is also used to submit or load priority rack 60c, which holds a sample container storing a sample to be measured preferentially, to sample measurement system 100. In addition, rack transport-in/transport-out device 300 is also used to receive retest rack 60d which holds a sample container storing a sample for which retest is determined to be necessary.

Rack transport-in/transport-out device 300 and retest standby unit 40 are set apart from each other on a horizontal floor in a facility of a user. Rack transport-in/transport-out device 300 and retest standby unit 40 are coupled by elongated transport unit 20. In the following description, the direction from rack transport-in/transport-out device 300 to retest standby unit 40 is referred to as the "supply direction", and the direction from retest standby unit 40 to rack transport-in/transport-out device 300 is referred to as the "return direction". The direction perpendicular to the supply direction and the return direction is referred to as the "front-and-back direction". The direction perpendicular to all of the supply direction, the return direction, and the front-and-back direction is referred to as the "up and down direction".

Sample measurement system 100 includes three measurement units 10 and three information process units 15. Three measurement units 10 are arranged forward of transport unit 20 alongside in the supply direction.

Measurement unit 10 is an immunity measurement unit for measuring a sample of serum using Chemiluminescent Enzyme Immunoassay (CLEIA), and testing various items such as hepatitis B, hepatitis C, a tumor marker, and thyroid hormone. Measurement unit 10 includes an aspirator for aspirating a sample, and aspirates a sample stored in a sample container which is a test tube. Measurement unit 10 mixes the aspirated sample and a reagent to prepare a measurement specimen, and measures the sample by optically measuring the measurement specimen.

Measurement unit 10 is not limited to an immunity measurement unit, and may be another measurement unit. For instance, measurement unit 10 may be a blood cell measurement unit that classifies and counts the blood cells contained in the entire blood sample using a flow cytometry method. Measurement unit 10 may be a blood coagulation measurement unit for testing items related to a blood coagulation function using a coagulation method, a synthetic substrate method, or an immunonephelometry. Measurement unit 10 may be a urine particle measurement unit that measures particles contained in a urine sample by a flow cytometry method or analysis of microscopic images. Measurement unit 10 may be a biochemical measurement unit for measuring a serum or a urine specimen using a colorimetric measurement method, and testing measurement items related to sugar, cholesterol, protein, enzyme and others.

The number of measurement units 10 is not limited to three. Multiple measurement units 10 of the same type may be set, or multiple types of measurement units may be set.

Information process unit 15 is formed of a personal computer. Three information process units 15 correspond to three measurement units 10 in a one-on-one manner. In other words, one information process unit 15 is connected to one measurement unit 10.

Each measurement unit 10 transmits measurement data obtained by measuring a sample to corresponding information process unit 15. Information process unit 15 analyzes the measurement data, and generates and displays a result of the analysis. Information process unit 15 is connected to host computer 80. Host computer 80 stores an order for each sample, and transmits an order according to a request from information process unit 15. Upon receiving an order, information process unit 15 controls the measurement unit to perform sample measurement for the measurement items specified in the order. When a result of analysis is obtained, information process unit 15 transmits the result of analysis to host computer 80. Host computer 80 stores the result of analysis received from information process unit 15 in a database.

Transport unit 20 transports pre-measurement rack 60a from transport-in/transport-out unit 30 to measurement unit 10, and transports post-measurement rack 60b to transport-in/transport-out unit 30.

Figure 2:
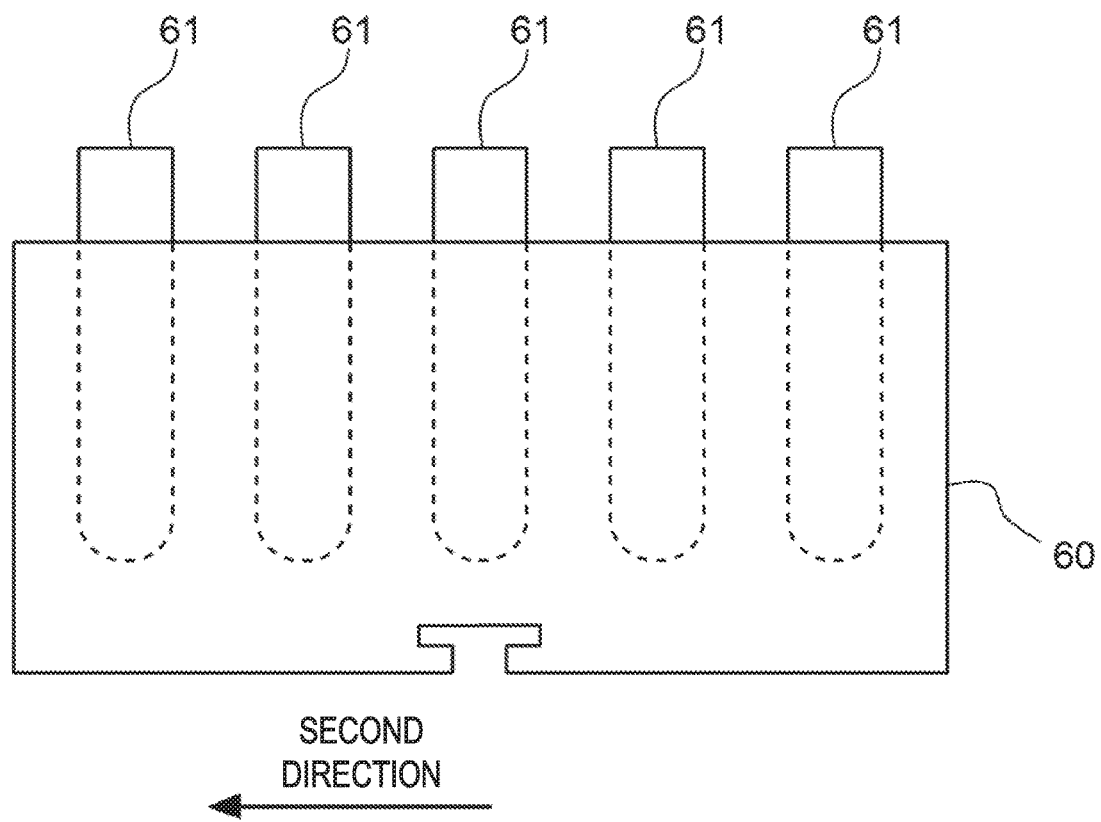
FIG. 2 is a front view illustrating the configuration of a rack.

As illustrated in FIG. 2, rack 60 holds five sample containers 61 which are test tubes arranged in a line in a longitudinal direction. Hereinafter, the longitudinal direction of rack 60 is referred to as a "second direction", and the transverse direction of rack 60 is referred to as a "first direction". The opposite direction to the first direction is called a "third direction", and the opposite direction to the second direction is called a "fourth direction".

Referring to FIG. 1 again, transport unit 20 includes first transporter 21 for transporting pre-measurement rack 60a to measurement unit 10, and second transporter 22 for returning post-measurement rack 60b. First transporter 21 and second transporter 22 are elongated conveyor belts extending in parallel. First transporter 21 transports pre-measurement rack 60a in the supply direction. Second transporter 22 transports post-measurement rack 60b in the return direction. It is to be noted that first transporter 21 and second transporter 22 are not limited to conveyor belts. First transporter 21 and second transporter 22 may transport rack 60 by pushing rack 60 using a member such as a lever, or may transport rack 60 by moving rack 60 by a claw-shaped member engaged with rack 60.

Transport unit 20 is provided with measurement path 23 at each of portions corresponding to measurement units 10. Measurement path 23 is a transfer path for rack 60, and is connected to first transporter 21. After pre-measurement rack 60a is transported by first transporter 21 to the vicinity of measurement unit 10 at a transport destination, pre-measurement rack 60a is pulled to measurement path 23 corresponding to the transport destination. Measurement unit 10 aspirates a sample from sample container 61 held in pre-measurement rack 60a pulled to measurement path 23, and performs measurement. Post-measurement rack 60b holding sample containers 61 from all of which samples have been aspirated is transferred from measurement path 23 to first transporter 21, and is transported by first transporter 21 in the supply direction.

Transport-in/transport-out unit 30 is a unit for a user to submit or load pre-measurement rack 60a to sample measurement system 100, or to collect or unload post-measurement rack 60b from sample measurement system 100, and is also a rack loader/unloader unit. Transport-in/transport-out unit 30 is connectable to other transport-in/transport-out units 30 in the supply direction and the return direction. Rack transport-in/transport-out device 300 may include any number of transport-in/transport-out units 30. In addition, bar code read unit 70 can be connected, in the supply direction, to transport-in/transport-out unit 30. Hereinafter, any unit connected to the upstream side of a unit in the supply direction is referred to as a preceding-stage unit, and any unit connected to the downstream side of a unit in the supply direction is referred to a subsequent-stage unit.

Transport-in/transport-out unit 30 includes setting part 31 in which multiple racks 60 can be set in a line in the transverse direction of racks 60, that is, the first direction; transport-out part 32 that is disposed at one end side of setting part 31, and that sends rack 60 from setting part 31; and transport-in part 33 that is disposed at the other end side of setting part 31, and that receives rack 60 at setting part 31. In other words, transport-in/transport-out unit 30 can send pre-measurement rack 60a from one end side in the first direction to first transporter 21, and can receive post-measurement rack 60b, transported by second transporter 22, from the other end side in the first direction.

Setting part 31 has an elongated rectangular shape in the front-and-back direction in a plan view, and is formed flatly to facilitate setting of racks 60. Setting part 31 is provided on the upper surface of transport-in/transport-out unit 30. The width of setting part 31 is slightly larger than the length of each rack 60, and multiple racks 60 can be placed alongside in setting part 31 in the front-and-back direction. That is, in a state where racks 60 are set in setting part 31, the first direction aligns with the front direction, the second direction aligns with the supply direction, the third direction aligns with the back direction, and the fourth direction aligns with the return direction.

The configuration of transport-in/transport-out unit 30 is described in more detail with reference to FIG. 3. Transport-out part 32 is provided forward of setting part 31, and transport-in part 33 is provided rearward of setting part 31. Setting part 31 is provided with a transfer unit 34 for transferring rack 60 in the first direction. Transfer unit 34 is a claw-shaped member that can project from both sides of setting part 31, and that moves in the first direction in a projecting state. Transfer unit 34 is engaged with the both sides of rack 60 and moves in the first direction, thereby transferring rack 60 in the first direction.

As illustrated in FIG. 1, in rack transport-in/transport-out device 300, multiple transport-in/transport-out units 30 are arranged side by side in a row in the second direction orthogonal to the first direction. The transfer direction of rack 60 is the forward direction, that is, the first direction which is common between transport-in/transport-out units 30. Transport-out parts 32 of transport-in/transport-out units 30 continue in series in the second direction, and transport-in parts 33 also continue in series in the second direction.

Figure 3:
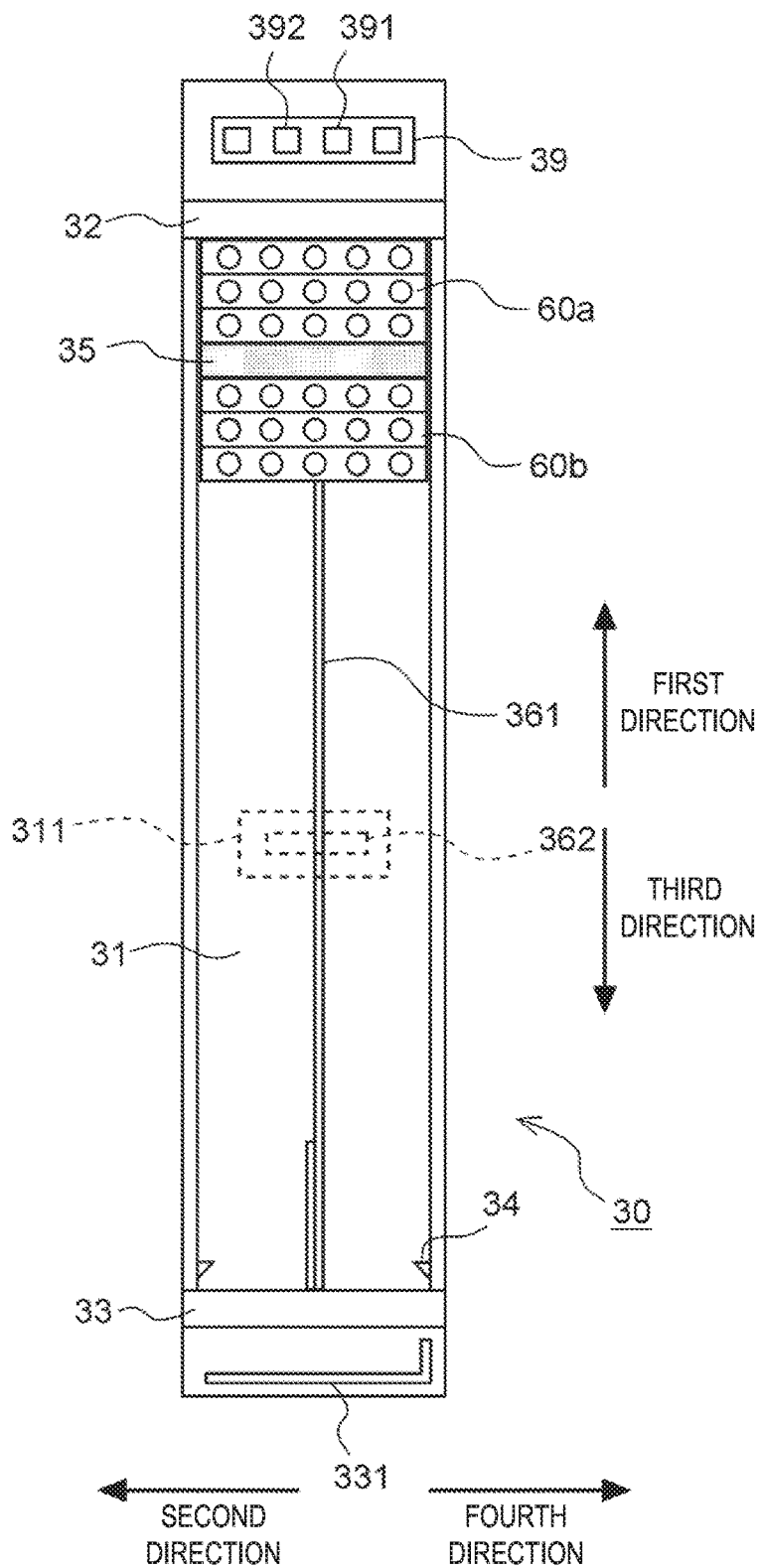
FIG. 3 is a plan view illustrating the configuration of a transport-in/transport-out unit.

As illustrated in FIG. 3, transfer prevention part 35 for preventing transfer of post-measurement rack 60b to transport-out part 32 is attached to setting part 31. Transfer prevention part 35 is attached to setting part 31 so as to be movable in the first direction and the third direction in setting part 31.

Multiple racks 60 can be set in the front and back areas which interpose transfer prevention part 35 of setting part 31. Transfer unit 34 transfers multiple racks 60 and transfer prevention parts 35 integrally. When transfer unit 34 transfers one rack 60 in the first direction, each rack 60 and transfer prevention part 35 forward of the one rack 60 are pushed and transferred in the first direction by the one rack 60 which is directly transferred by transfer unit 34. Similarly, when transfer unit 34 transfers transfer prevention part 35 in the first direction, each rack 60 forward of transfer prevention part 35 is pushed and transferred in the first direction by transfer prevention part 35.

Transport-in part 33 and transport-out part 32 are each a conveyor belt for transporting racks 60. Transport-in part 33 receives post-measurement rack 60b from the preceding-stage unit, and transports post-measurement rack 60b in the fourth direction. Transport-in part 33 is provided with a sensor which detects the presence or absence of post-measurement rack 60b in transport-in part 33. The back side of transport-in part 33 is provided with introduction part 331 for introducing post-measurement rack 60b from transport-in part 33 to setting part 31. When entire post-measurement rack 60b is positioned rearward of setting part 31, introduction part 331 pushes post-measurement rack 60b in the first direction, and sends rack 60b to setting part 31. It is to be noted that transport-in part 33 and transport-out part 32 are not limited to a conveyor belt. Also, introduction part 331 not necessarily pushes post-measurement rack 60b from transport-in part 33 to setting part 31, and may be configured to draw post-measurement rack 60b from transport-in part 33 to setting part 31.

Transport-in part 33 may transfer post-measurement rack 60b received from the preceding-stage unit to the subsequent-stage unit without sending rack 60b to setting part 31.

Racks 60 set in setting part 31 along with transfer prevention part 35 are transferred in the first direction by transfer unit 34. Rack 60 positioned at the front end is transferred from setting part 31 to transport-out part 32. Transport-out part 32 has a size that allows one rack 60 to be set. Transport-out part 32 transports the received rack 60 in the second direction, and sends rack 60 to the preceding-stage unit. Transport-out part 32 is provided with a sensor which detects the presence or absence of rack 60 in transport-out part 32.

Transport-out part 32 may receive pre-measurement rack 60a from the subsequent-stage unit, and may transfer rack 60a to the preceding-stage unit.

Pre-measurement rack 60a is set in an area forward of transfer prevention part 35 in setting part 31. As described above, post-measurement rack 60b is received by transport-in part 33, and is sent from transport-in part 33 to setting part 31. Since transfer prevention part 35 is on setting part 31, transfer prevention part 35 is invariably positioned forward of post-measurement rack 60b received by transport-in part 33. Therefore, post-measurement rack 60b is set in an area rearward of transfer prevention part 35 in setting part 31. Thus, transfer prevention part 35 also serves as a partition section between pre-measurement racks 60a and post-measurement racks 60b.

A user can check how many pre-measurement racks 60a are left by visually recognizing transfer prevention part 35.

Figure 4:
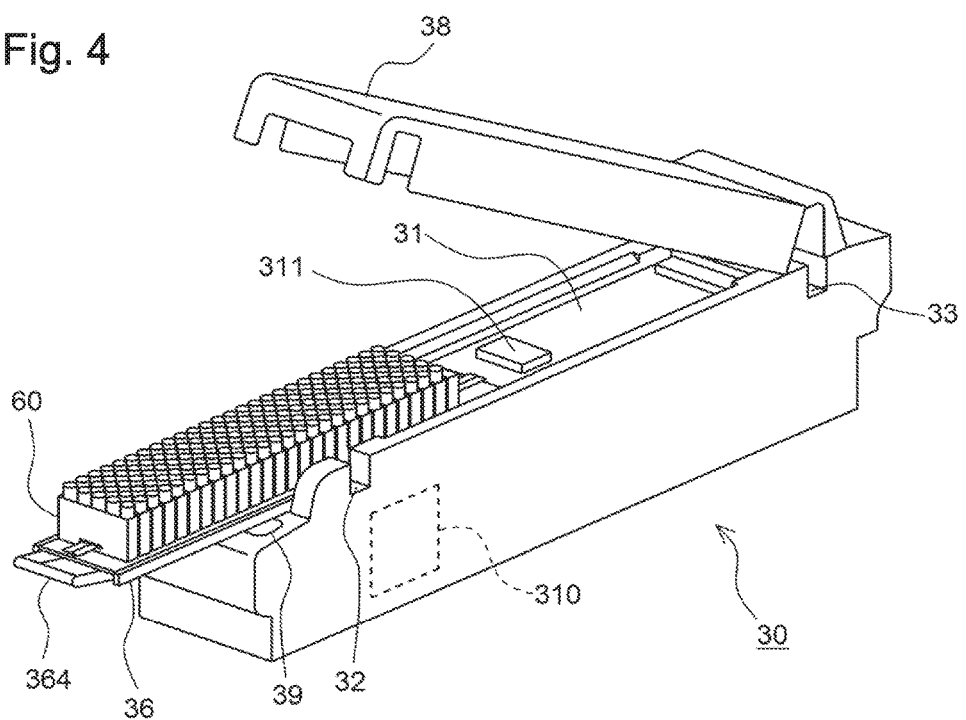
FIG. 4 is a perspective view illustrating the configuration of a transport-in/transport-out unit.

FIG. 4 is referred to. Setting part 31 has a detachable tray 36 in which multiple racks 60 can be set. That is, multiple racks 60 can be set in setting part 31 using tray 36. One end of tray 36 is provided with gripper 364. A user grasps gripper 364 and can attach or detach tray 36 to or from transport-in/transport-out unit 30, or can carry tray 36. Tray 36 is inserted in setting part 31 from the front side. When tray 36 is mounted in setting part 31, gripper 364 is positioned on the front side. Attachment and detachment of tray 36 to and from setting part 31 is detected by a sensor.

Figure 5:
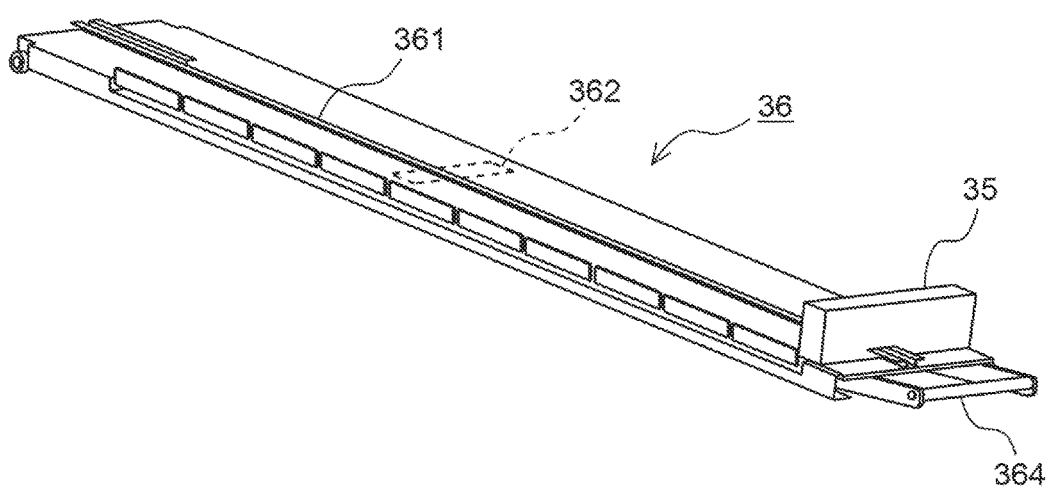
FIG. 5 is a perspective view illustrating the configuration of a tray.

As illustrated in FIG. 5, transfer prevention part 35 is attached to tray 36. Thus, transfer prevention part 35 along with tray 36 is attached or detached to or from transport-in/transport-out unit 30.

The upper surface of tray 36 is provided with rail-shaped guidance section 361 extending in a longitudinal direction. Guidance section 361 is engaged with rack 60. Rack 60 is movable on the upper surface of tray 36 in the first direction while being engaged with guidance section 361. Therefore, guidance section 361 can guide transfer of rack 60 in tray 36, and rack 60 is prevented from coming off tray 36.

Bar code label 362 is affixed to the back surface of tray 36. A bar code (hereinafter referred to as a "tray bar code") obtained by encoding a tray ID that is identification information is printed on bar code label 362.

As illustrated in FIG. 4, transport-in/transport-out unit 30 includes bar code reader 311 that is an identification information acquirer. As illustrated in FIG. 3, when tray 36 is mounted in transport-in/transport-out unit 30, bar code label 362 is positioned at a reading position facing bar code reader 311. When bar code label 362 is at a reading position, bar code reader 311 can read a tray ID from the tray bar code.

As illustrated in FIG. 4, transport-in/transport-out unit 30 includes cover 38 that covers setting part 31. By providing cover 38, dirt is prevented from entering into sample container 61, and contact with rack 60 on setting part 31 is prevented.

Transport-in/transport-out unit 30 may not be provided with cover 38. In particular, when a rack holding a sample container with a lid is transported, there is no possibility of entering of dirt into the sample container, and thus cover 38 may not be provided.

As illustrated in FIG. 3, transport-in/transport-out unit 30 is provided with operation panel 39 forward of transport-out part 32. Operation panel 39 is provided with multiple operation buttons including start button 391 that is a start instruction section, and suspension button 392 that is a suspension instruction section.

As illustrated in FIG. 4, transport-in/transport-out unit 30 internally includes controller 310. Controller 310 controls each component of transport-in/transport-out unit 30, and communicates with control unit 50.

Retest transport unit 90 is described with reference to FIG. 1 again. Retest transport unit 90 includes setting part 91, transport-out part 92, and transport-in part 93.

Retest transport unit 90 is disposed between bar code read unit 70 and transport-in/transport-out unit 30. Transport-out part 92 is connected to transport-out part 32 of transport-in/transport-out unit 30. Transport-in part 93 is connected to transport-in part 33 of transport-in/transport-out unit 30. Retest transport unit 90 receives retest rack 60d, which holds a sample container storing a sample for which retest is determined to be necessary, by transport-in part 93, and sets retest rack 60d in setting part 91. When priority rack 60c is present, a user can set priority rack 60c in setting part 91. A sample that needs retest should be measured preferentially, and retest rack 60d is a type of priority rack 60c. Here, retest rack 60d and priority rack 60c other than retest rack 60d are distinguished and described.

Setting part 91 has an elongated rectangular shape in the first direction in a plan view, and is formed flatly so as to receive racks 60. Setting part 91 is provided on the upper surface of retest transport unit 90. The width of setting part 91 is slightly larger than the length of each rack 60, and multiple racks 60 can be placed alongside in setting part 91 in the first direction.

Transport-out part 92 is provided forward of setting part 91, and transport-in part 93 is provided rearward of setting part 91. In setting part 91, each rack 60 is transferred in the first direction.

Transport-out part 92 and transport-in part 93 are conveyor belts for transporting rack 60. Transport-in part 93 receives rack 60 transported by a second transporter 22 via bar code read unit 70. When the received rack is post-measurement rack 60b to be collected, transport-in part 93 transports post-measurement rack 60b in the fourth direction, and sends post-measurement rack 60b to subsequent-stage transport-in/transport-out unit 30. When the received rack is retest rack 60d, transport-in part 93 sends retest rack 60d to setting part 91. In setting part 91, priority rack 60c or retest rack 60d is transferred in the first direction, and is sent to transport-out part 92.

Transport-out part 92 receives rack 60 transported in the first direction in setting part 91. Transport-out part 92 also receives pre-measurement rack 60a from adjacent transport-in/transport-out unit 30. Transport-out part 92 transports rack 60 in the second direction, and sends rack 60 to bar code read unit 70. It is to be noted that transport-out part 92 and transport-in part 93 are not limited to a conveyor belt.

Next, bar code read unit 70 is described. Bar code reading unit 70 includes bar code reader 71, setting part 72, transport-in part 73, transport-out part 74, and transporter 75.

Bar code reading unit 70 is connected to transport unit 20 and retest transport unit 90. Transport-in part 73 is connected to transport-out part 92 of retest transport unit 90. Transport-out part 74 is connected to a first transporter 21 of transport unit 20. Transporter 75 is connected to the second transporter 22 of transport unit 20 and transport-in part 93 of retest transport unit 90. Bar code read unit 70 is used for receiving pre-measurement rack 60a, priority rack 60c or retest rack 60d from transport-out part 92 of retest transport unit 90, for reading the bar code of pre-measurement rack 60a, priority rack 60c or retest rack 60d, and for sending pre-measurement rack 60a, priority rack 60c or retest rack 60d to the first transporter 21. Bar code reading unit 70 is used for receiving post-measurement rack 60b or retest rack 60d, and for sending post-measurement rack 60b or retest rack 60d to transport-in part 93 of retest transport unit 90.

Bar code reader 71 reads a rack ID to identify a rack from a bar code (hereinafter referred to as a "rack bar code") affixed to the rack, and reads a sample ID to identify a sample from a bar code (hereinafter referred to as a "sample container bar code") affixed to a sample container.

Setting part 72 has an elongated rectangular shape in first direction in a plan view, and is formed flatly to receive racks 60. Setting part 72 is provided on the upper surface of bar code read unit 70. The width of setting part 72 is slightly larger than the length of each rack 60, and multiple racks 60 can be placed alongside in setting part 72 in first direction. The front end of setting part 72 is provided with bar code reader 71.

Transport-in part 73 is provided forward of setting part 72, and the transport-out part 74 and the transporter 75 are provided rearward of setting part 72. In setting part 72, each rack 60 is transferred in the third direction.

Transport-in part 73 and transport-out part 74 are a conveyor belt for transporting rack 60. Transport-in part 73 receives pre-measurement rack 60a, priority rack 60c or retest rack 60d from retest transport unit 90, and transports pre-measurement rack 60a, priority rack 60c or retest rack 60d in the second direction. Pre-measurement rack 60a, priority rack 60c or retest rack 60d on transport-in part 73 is sent to setting part 72. It is to be noted that transport-in part 73 and transport-out part 74 are not limited to a conveyor belt.

Pre-measurement rack 60a, priority rack 60c or retest rack 60d, which are set in setting part 72 and for which the rack bar code and the sample bar code are read by bar code reader 71, are transferred on setting part 72 in the third direction, and transferred from setting part 72 to transport-out part 74. Transport-out part 74 has a size that allows one rack 60 to be set. Transport-out part 74 transports the received pre-measurement rack 60a, priority rack 60c or retest rack 60d in the second direction, and sends the received rack to the first transporter 21 of transport unit 20.

Retest standby unit 40 is set on the downstream side of transport unit 20 in the second direction. Retest standby unit 40 is connected to first transporter 21, and receives each post-measurement rack 60b. Multiple post-measurement racks 60b can be set in retest standby unit 40. Retest standby unit 40 is used for keeping post-measurement rack 60b on standby until a determination result as to necessity of retest is obtained.

Retest standby unit 40 is connected to the second transporter 22, and sends post-measurement completion rack 60 holding a sample for which necessity of retest is determined to the second transporter 22. Post-measurement completion rack 60 includes post-measurement rack 60b for which a retest of each sample is determined to be unnecessary, and retest rack 60d which holds a sample for which retest is determined to be necessary. "Post-measurement completion" referred to herein means that measurement of all samples held in rack 60 is completed. Post-measurement rack 60b set in retest standby unit 40 includes not only rack 60 for which measurement of all samples is completed but also rack 60 for which measurement of part or all of samples is incomplete although the samples are aspirated depending on measurement unit 10. Second transporter 22 transports post-measurement rack 60b for which measurement of all samples is completed, and does not transport post-measurement rack 60b for which measurement of part or all of samples is incomplete.

Sample measurement system 100 does not need to be provided with retest standby unit 40. In this case, instead of retest standby unit 40, a unit can be used, which receives post-measurement rack 60b from first transporter 21, and sends post-measurement rack 60b to second transporter 22. Rack 60 for which determination as to necessity of retest is incomplete is collected by transport-in/transport-out unit 30, and after determination as to necessity of retest is completed, a user may take retest rack 60d from transport-in/transport-out unit 30 and may submit or load retest rack 60d to retest transport unit 90.

Figure 6:
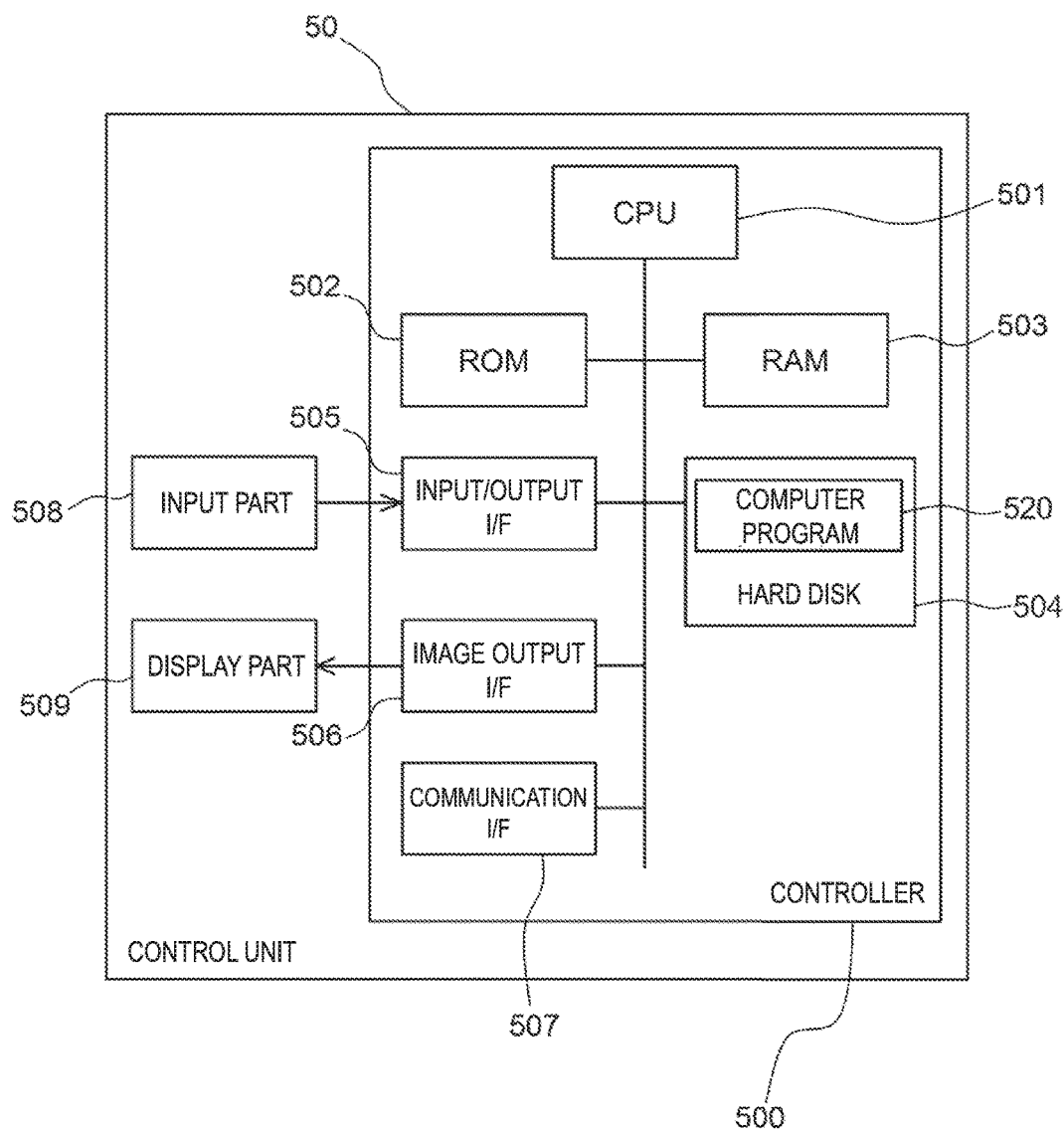
FIG. 6 is a block diagram illustrating the configuration of a control unit.

Control unit 50 is formed of a computer. Referred to FIG. 6, the configuration of control unit 50 is described.

Control unit 50 includes controller 500, input part 508, and display part 509. Controller 500 has CPU 501, ROM 502, RAM 503, hard disk 504 that is a storage, Input/output interface 505, image output interface 506, and communication interface 507.

CPU 501 executes a computer program stored in ROM 502 and a computer program loaded to RAM 503. RAM 503 is used for reading a computer program recorded on ROM 502 and hard disk 504. RAM 503 is also utilized as a workspace of CPU 501 when a computer program is executed.

Computer program 520 for determining a transport destination of rack 60 is installed on hard disk 504.

Input part 508 is connected to Input/output interface 505. Display part 509 is connected to image output interface 506. Transport unit 20, rack transport-in/transport-out device 300, and retest standby unit 40 are connected to communication interface 507, and performs data communication with control unit 50.

Communication interface 507 is connected to host computer 80. Orders for sample measurement are registered in host computer 80, and transmits an order according to an inquiry from control unit 50.

<Operation of Sample Measurement System>

First, the outline of operation of sample measurement system 100 is described with focus on one rack 60 with reference to FIG. 7.

In step S1, transport-in/transport-out unit 30 sends pre-measurement rack 60a to bar code read unit 70.

As illustrated in FIG. 8A, in the stage immediately after tray 36 is mounted to setting part 31, transfer prevention part 35 is positioned on the back side of setting part 31, and multiple pre-measurement racks 60a are set in the area on the front side of transfer prevention part 35 in setting part 31.

When pre-measurement rack 60a is sent to the preceding-stage unit, as illustrated in FIG. 8B, transfer unit 34 transfers transfer prevention part 35 in the first direction, thereby transferring all pre-measurement racks 60a on the front side of transfer prevention part 35 in the first direction. At this point, pre-measurement rack 60a on the front most side is transferred to transport-out part 32. Transport-out part 32 transports pre-measurement rack 60a in the second direction and sends pre-measurement rack 60a to the preceding-stage unit.

FIG. 7 will be referred to again. In step S2, bar code reader 71 of bar code read unit 70 reads the rack ID from the rack bar code of pre-measurement rack 60a and the sample ID from the sample container bar code of the sample container in pre-measurement rack 60a. Rack ID and sample ID which have been read are transmitted to control unit 50.

In step S3, control unit 50 inquires an order to host computer 80 using a rack ID and a sample ID as keys. Host computer 80 retrieves an order matching the received rack ID and sample ID, and transmits the order to control unit 50.

In step S4, control unit 50 receives the order from host computer 80, and determines a transport destination of pre-measurement rack 60a based on the order. The order includes information on measurement items, and control unit 50 determines a transport destination to be measurement unit 10 that can measure a measurement item requested in the order. In this process, control unit 50 avoids transport of pre-measurement rack 60a to a specific measurement unit 10 in a concentrated manner.

When a transport destination is determined, in step S5, bar code read unit 70 sends pre-measurement rack 60a to first transporter 21 of transport unit 20. In step S6, transport unit 20 transports pre-measurement rack 60a in the second direction by first transporter 21. Measurement path 23 corresponding to measurement unit 10 at a transport destination draws pre-measurement rack 60a, and pre-measurement rack 60a is transported to measurement unit 10.

When pre-measurement rack 60a arrives at measurement unit 10 at a transport destination, in step S7, measurement unit 10 aspirates a sample from sample container 61 held in pre-measurement rack 60a, and measures the sample. When multiple samples are held in pre-measurement rack 60a, measurement unit 10 measures all the samples.

In step S8, transport unit 20 transfers post-measurement rack 60b, from which all the samples are aspirated and measured, to first transporter 21 by measurement path 23, and transports post-measurement rack 60b to retest standby unit 40 by first transporter 21. Retest standby unit 40 holds post-measurement rack 60b until a determination result as to necessity of retest is obtained.

The necessity of retest is determined by host computer 80 or measurement unit 10. A determination result as to necessity of retest is transmitted to control unit 50. In step S9, control unit 50 determines a transport destination of post-measurement rack 60b according to the determination result as to necessity of retest. The transport destination of post-measurement rack 60b holding only samples for each of which retest is determined to be unnecessary is transport-in/transport-out unit 30. Control unit 50 determines that the transport destination of post-measurement rack 60b holding only samples for each of which retest is determined to be unnecessary is transport-in/transport-out unit 30 which has space in setting part 31. The transport destination of post-measurement rack 60b holding a sample for which retest is determined to be necessary is retest transport unit 90.

In step S10, when the transport destination of rack 60 is transport-in/transport-out unit 30, in step S11, retest standby unit 40 sends post-measurement rack 60b to the second transporter 22 of transport unit 20. In step S12, transport unit 20 transports, with the second transporter 22, post-measurement rack 60b to transport-in/transport-out unit 30 at the transport destination.

Post-measurement rack 60b is sent from the second transporter 22 to transport-out part 74 of bar code read unit 70, and is sent to transport-in part 33 of adjacent transport-in/transport-out unit 30 by transport-out part 74. When post-measurement rack 60b arrives at transport-in part 33 of target transport-in/transport-out unit 30, introduction part 331 sends post-measurement rack 60b to setting part 31, and in step S13, transport-in/transport-out unit 30 collects post-measurement rack 60b. For post-measurement rack 60b holding only samples for each of which retest is determined to be unnecessary, the transport operation is completed now.

In step S10, when the transport destination of rack 60 is retest transport unit 90, in step S14, retest standby unit 40 sends retest rack 60d to the second transporter 22 of transport unit 20. In step S15, transport unit 20 transports, with the second transporter 22, retest rack 60d to retest transport unit 90 at the transport destination.

Retest rack 60d is sent from second transporter 22 to transporter 75 of bar code read unit 70, and is sent to transport-in part 93 of retest transport unit 90 by transporter 75. When retest rack 60d arrives at transport-in part 93 of retest transport unit 90, retest transport unit 90 sends retest rack 60d from transport-in part 93 to setting part 91.

Retest transport unit 90 transfers retest rack 60d in setting part 91 in the first direction, and in step S16, sends retest rack 60d to bar code read unit 70. Subsequently, for retest rack 60d, the operation in or after step S2 is repeated.

Figure 9A:
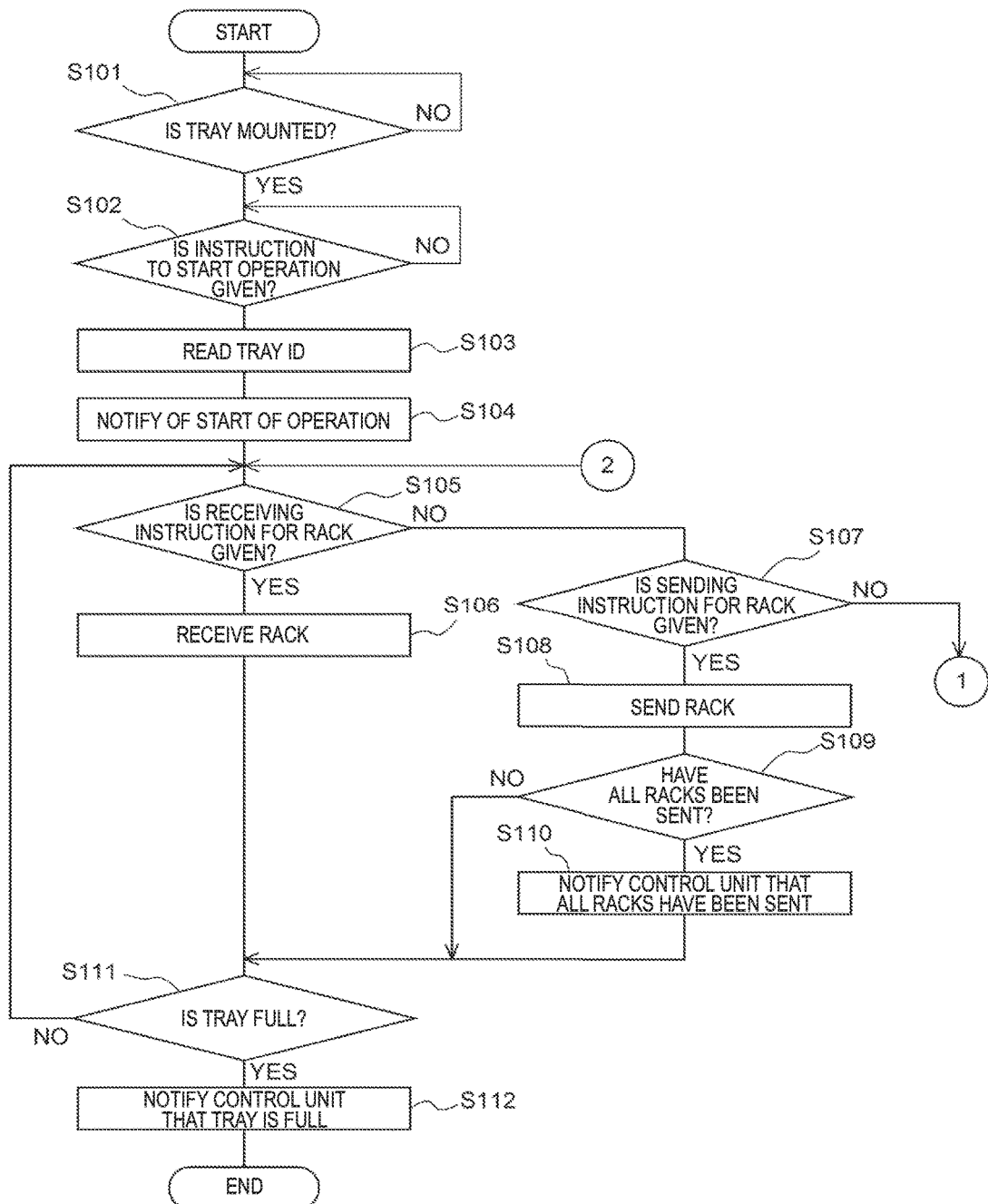
FIG. 9A is a flowchart illustrating operational steps of a transport-in/transport-out unit.
Figure 9B:
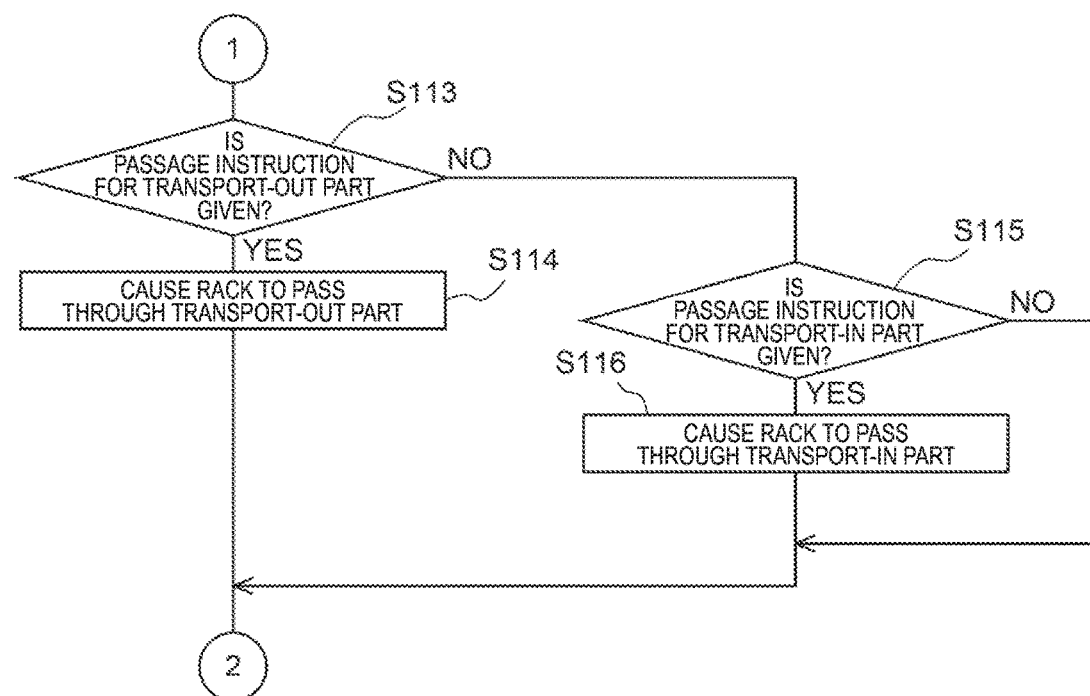
FIG. 9B is a flowchart illustrating operational steps of a transport-in/transport-out unit.

The detailed operation of transport-in/transport-out unit 30 is described with reference to FIG. 9A and FIG. 9B. When a sample is measured by sample measurement system 100, a user first mounts tray 36 to setting part 31 of transport-in/transport-out unit 30. When tray 36 is mounted to setting part 31, cover 38 is opened. Tray 36 holds multiple pre-measurement racks 60a. A user mounts tray 36 to setting part 31 in a sliding manner from the front side of transport-in/transport-out unit 30. After tray 36 is mounted to setting part 31, a user closes cover 38.

In step S101, controller 310 of transport-in/transport-out unit 30 determines whether or not tray 36 is mounted to setting part 31. When tray 36 is not mounted, in step S101, controller 310 causes the flow to proceed to NO, and repeats the processing in step S101. When tray 36 is mounted, in step S101, controller 310 causes the flow to proceed to YES, and executes step S102.

After tray 36 is mounted to setting part 31, preparation for starting operation of transport-in/transport-out unit 30 is completed. A user presses start button 391 and gives an instruction to start operation to transport-in/transport-out unit 30. In step S102, controller 310 determines whether or not an instruction to start operation has been received. When start button 391 has not been pressed, in step S102, controller 310 causes the flow to proceed to NO, and repeats the processing in step S102. When start button 391 has been pressed, in step S102, controller 310 causes the flow to proceed to YES, and executes step S103.

In step S103, bar code reader 311 reads a tray ID from the tray bar code. After reading the tray ID, in step S104, controller 310 transmits a notification signal for starting the operation to control unit 50.

When post-measurement rack 60b is collected by one transport-in/transport-out unit 30, control unit 50 transmits an instruction signal for instructing transport-in of post-measurement rack 60b to relevant transport-in/transport-out unit 30.

In step S105, controller 310 determines whether or not a receiving instruction for post-measurement rack 60b is given. When a receiving instruction for post-measurement rack 60b is given, in step S105, controller 310 causes the flow to proceed to YES, and executes step S106.

In step S106, controller 310 performs a transport operation on post-measurement rack 60b. In the processing in step S106, transport-in part 33 operates, thus post-measurement rack 60b is transferred from the preceding-stage unit to transport-in part 33. Subsequently, introduction part 331 moves in the first direction, and pushes post-measurement rack 60b to setting part 31. As illustrated in FIG. 8C, post-measurement rack 60b is transferred to an area on the back side of transfer prevention part 35 in setting part 31. The subsequent post-measurement racks 60b are sequentially transferred to an area on the back side of transfer prevention part 35 in a similar manner. As illustrated in FIG. 8D, multiple post-measurement racks 60b are set alongside in an area on the back side of transfer prevention part 35.

FIG. 9A is referred to again. After the processing in step S106 is completed, controller 310 executes step S111.

In step S105, when a receiving instruction for post-measurement racks 60b is not given, in step S105, controller 310 causes the flow to proceed to NO, and executes step S107.

When pre-measurement rack 60a is transported from one transport-in/transport-out unit 30, control unit 50 transmits an instruction signal for instructing transport-out of post-measurement rack 60b to relevant transport-in/transport-out unit 30.

In step S107, controller 310 determines whether or not a sending instruction for pre-measurement rack 60a is given. When a sending instruction for pre-measurement rack 60a is not given, in step S107, controller 310 causes the flow to proceed to NO, and returns the processing to step S113. When a sending instruction for pre-measurement rack 60a is given, in step S107, controller 310 causes the flow to proceed to YES, and executes step S108.

In step S108, controller 310 performs a transport-out operation for pre-measurement rack 60a. In the processing in step S108, transfer unit 34 moves in the first direction, thereby transferring pre-measurement rack 60a set in setting part 31 to transport-out part 32. As illustrated in FIG. 8D, post-measurement rack 60b is set in an area on the back side of transfer prevention part 35, transfer unit 34 transfers post-measurement rack 60b on the back most side in the first direction. As illustrated in FIG. 8B, post-measurement rack 60b is not set in an area on the back side of transfer prevention part 35, transfer unit 34 transfers transfer prevention part 35 in the first direction. Consequently, all pre-measurement racks 60a, post-measurement racks 60b and transfer prevention part 35 set in setting part 31 are transferred in the first direction, and pre-measurement rack 60a on the front most side is transferred to transport-out part 32.

After each pre-measurement rack 60a is transferred to transport-out part 32, transfer unit 34 moves to a standby position at the back end of setting part 31. Subsequently, transport-out part 32 operates, and sends pre-measurement rack 60a on transport-out part 32 in the second direction. Consequently, pre-measurement rack 60a is transferred to the preceding-stage unit, and is transported to measurement unit 10.

Figure 8E:
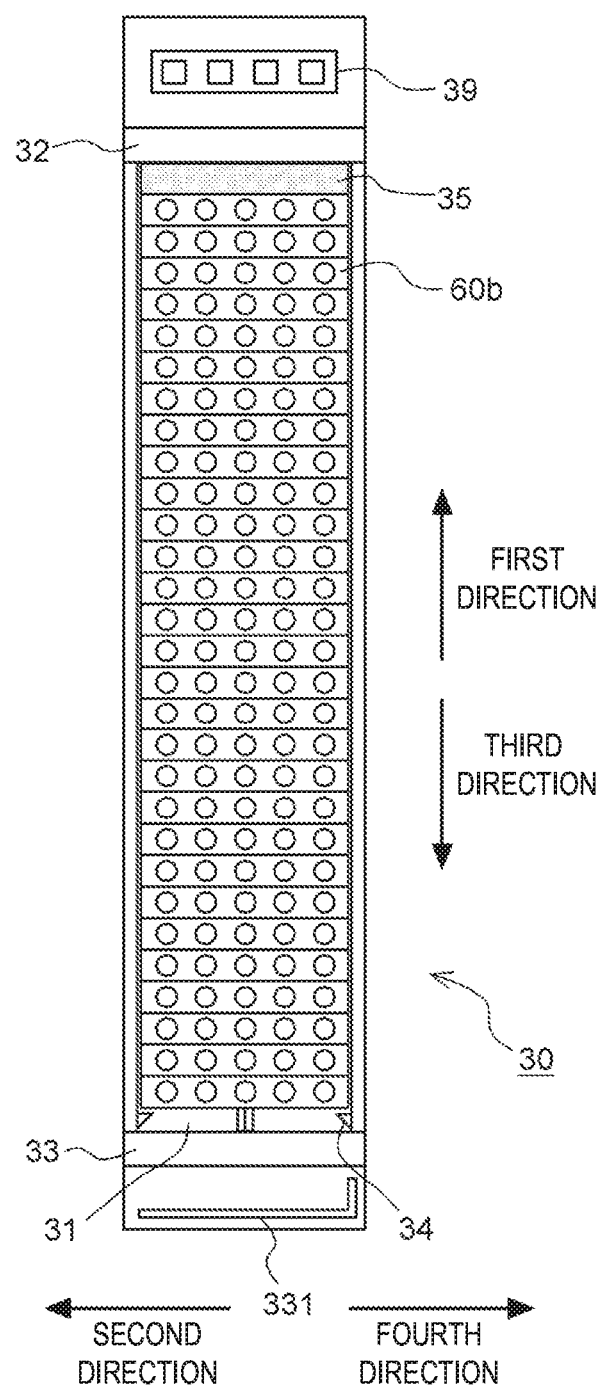
FIG. 8E is a plan view illustrating setting of a rack in a transport-in/transport-out unit.

When all pre-measurement racks 60a are transported from setting part 31, as illustrated in FIG. 8E, transfer prevention part 35 is positioned on the front side of all post-measurement racks 60b. At this point, even when transfer unit 34 attempts to transfer prevention part 35 in the first direction, transfer prevention part 35 is stopped by a stop member provided at the front end of tray 36, and thus transfer prevention part 35 is not transferred to transport-out part 32.

FIG. 9A is referred to again. In step S109, controller 310 determines whether or not all pre-measurement racks 60a have been sent. As illustrated in FIG. 8E, when all pre-measurement racks 60a are sent, transfer prevention part 35 is stopped at the front end of tray 36, and thus each pre-measurement rack 60a is not transferred onto transport-out part 32. The presence or absence of pre-measurement rack 60a on transport-out part 32 is detected by a sensor, and controller 310 determines whether or not all pre-measurement racks 60a have been sent. When all pre-measurement racks 60a have been sent, in step S109, controller 310 causes the flow to proceed to YES, and in S110, transmits a notification signal of completion of sending of racks to control unit 50. After step S110, controller 310 executes the processing in step S111. When some pre-measurement racks 60a are still left, controller 310 causes the flow to proceed to NO, and executes the processing in step S111.

In step S111, controller 310 determines whether or not the number of post-measurement racks 60b in setting part 31 has reached a predetermined upper limit. When the number of post-measurement racks 60b in setting part 31 has not reached the predetermined upper limit, in step S111, controller 310 causes the flow to proceed to NO, and returns the processing to step S105. When the number of post-measurement racks 60b in setting part 31 has reached the predetermined upper limit, in step S111, controller 310 causes the flow to proceed to YES, and executes step S112.

In step S112, controller 310 transmits a notification signal indicating that tray 36 is full to control unit 50, and completes the processing. Upon receiving the notification signal, control unit 50 displays a notification screen on display part 509 for notifying a user that tray 36 of transport-in/transport-out unit 30 is full. Thus, a user can see a time for replacement of tray 36 has arrived, and can replace tray 36 efficiently.

A user removes full tray 36 from transport-in/transport-out unit 30, and stores tray 36 in a storage chamber or the like.

When pre-measurement rack 60a is transported from one transport-in/transport-out unit 30 to bar code read unit 70 passing through adjacent preceding transport-in/transport-out unit 30, pre-measurement rack 60a needs to be passed through transport-out part 32 of preceding-stage transport-in/transport-out unit 30. In this case, control unit 50 transmits an instruction signal for instructing passage of transport-out part 32 to transport-in/transport-out unit 30 through which pre-measurement rack 60a is passed.

In step S113, controller 310 determines whether or not a passage instruction to pass transport-out part 32 is given. When a passage instruction is given, in step S113, controller 310 causes the flow to proceed to YES, and executes step S114. In step S114, controller 310 operates transport-out part 32, and pre-measurement rack 60a transported from the subsequent-stage unit is passed through transport-out part 32. After pre-measurement rack 60a is passed through, transport-out part 32 stops its operation. After the processing in step S114 is completed, controller 310 returns the processing to step S105.

In step S113, when a passage instruction to pass transport-out part 32 is not given, in step S113, controller 310 causes the flow to proceed to NO, and executes step S115.

When post-measurement rack 60b is transported from retest transport unit 90 to subsequent-stage transport-in/transport-out unit 30 passing through preceding-stage transport-in/transport-out unit 30, post-measurement rack 60b needs to be passed through transport-in part 33 of preceding-stage transport-in/transport-out unit 30. In this case, control unit 50 transmits an instruction signal for instructing passage of transport-in part 33 to transport-in/transport-out unit 30 through which post-measurement rack 60b is passed.

In step S115, controller 310 determines whether or not a passage instruction to pass transport-in part 33 is given. When a passage instruction is given, in step S115, controller 310 causes the flow to proceed to YES, and executes step S116. In step S116, controller 310 operates transport-in part 33, and causes post-measurement rack 60b transported from the preceding-stage unit to be passed through transport-in part 33. After post-measurement rack 60b is passed through, transport-in part 33 stops its operation. After the processing in step S116 is completed, controller 310 returns the processing to step S105.

In step S115, when a passage instruction for passing transport-in part 33 is not given, in step S115, controller 310 causes the flow to proceed to NO, and returns the processing to step S105.

During the above-described operation, a user can suspend a sending operation of racks by pressing suspension button 392. When suspension button 392 is pressed, controller 310 transmits a request signal for suspension of sending to control unit 50. When controller 50 receives the request signal for suspension of sending, a sending instruction is not given to all transport-in/transport-out units 30 and retest transport units 90 as described later. Therefore, the sending operation is suspended.

Even during sending operations are suspended, control unit 50 gives a receiving instruction and a transport-in part passage instruction to transport-in/transport-out units 30 and retest transport units 90. Therefore, even when operations are suspended, receiving operations are continued.

After sending operations are suspended, a user can resume the sending operations by pressing start button 391. When start button 391 is pressed, controller 310 transmits a sending resume request signal to control unit 50. When control unit 50 receives the sending resume request signal, a sending instruction is given again to transport-in/transport-out units 30 and retest transport units 90 as described later. Therefore, the sending operation is resumed.

During sending operations are suspended, a user can detach a tray from each transport-in/transport-out unit 30. When a tray is detached from transport-in/transport-out unit 30, controller 310 transmits a notification signal of tray detachment to control unit 50. In this case, sending of rack 60 is resumed in transport-in/transport-out units 30 other than transport-in/transport-out unit 30 with a tray detached, and in retest transport units 90.

The detailed operation of retest transport unit 90 is described with reference to FIG. 10. In step S201, the controller of retest transport unit 90 determines whether or not a receiving instruction for retest rack 60d is given. When a receiving instruction for retest rack 60d is given, in step S201, retest transport unit 90 causes the flow to proceed to YES, and executes step S202.

In step S202, retest transport unit 90 performs a receiving operation of retest rack 60d. In the processing in step S202, transport-in part 93 operates, thus retest rack 60d is transferred from bar code read unit 70 to transport-in part 93. Retest transport unit 90 transfers retest rack 60d on transport-in part 93 in the first direction, and introduces retest rack 60d into setting part 91. After step S202, retest transport unit 90 executes step S204.

Meanwhile, a user can set priority rack 60c to setting part 91 of retest transport unit 90. When a user sets priority rack 60c to setting part 91, priority rack 60c is detected by a sensor provided in setting part 91. Thus, retest transport unit 90 determines the presence of priority rack 60c in setting part 91.

In step S201, when a receiving instruction for retest rack 60d is not given, in step S201, retest transport unit 90 causes the flow to proceed to NO, and executes step S203. In step S203, retest transport unit 90 determines whether or not priority rack 60c is set in setting part 91. When priority rack 60c is set in setting part 91, in step S203, retest transport unit 90 causes the flow to proceed to YES, and executes step S204.

In step S204, retest transport unit 90 transmits a rack sending instruction request signal to control unit 50. In step S205, retest transport unit 90 determines whether or not a sending instruction for priority rack 60c or retest rack 60d is given. When a sending instruction for priority rack 60c or retest rack 60d is not given, in step S205, retest transport unit 90 causes the flow to proceed to NO, and executes the processing in step S205 again, then stays in standby until a sending instruction is given. When a sending instruction for priority rack 60c or retest rack 60d is given, in step S205, retest transport unit 90 causes the flow to proceed to YES, and executes step S206.

In step S206, retest transport unit 90 performs a sending operation on priority rack 60c or retest rack 60d of setting part 91. In the processing in step S206, retest transport unit 90 transfers priority rack 60c or retest rack 60d set in setting part 91 to transport-out part 92. Subsequently, transport-out part 92 operates, and sends pre-measurement rack 60a on transport-out part 92 in the second direction. Consequently, priority rack 60c or retest rack 60d is transferred to bar code read unit 70, and is transported to measurement unit 10.

After step S206, retest transport unit 90 completes the processing.

In step S203, when priority rack 60c is not set in setting part 91, in step S203, retest transport unit 90 causes the flow to proceed to NO, and executes S207.

When pre-measurement rack 60a is transported from one transport-in/transport-out unit 30 to bar code read unit 70 passing through retest transport unit 90, pre-measurement rack 60a needs to be passed through transport-out part 92 of retest transport unit 90. In this case, control unit 50 transmits an instruction signal for instructing passage of transport-out part 92 to retest transport unit 90.

In step S207, retest transport unit 90 determines whether or not a passage instruction for passing transport-out part 92 is given. When a passage instruction is given, in step S207, retest transport unit 90 causes the flow to proceed to YES, and executes step S208. In step S208, retest transport unit 90 operates transport-out part 92, and causes pre-measurement rack 60a sent from subsequent-stage transport-in/transport-out unit 30 to be passed through transport-out part 92. After pre-measurement rack 60a is passed through, transport-out part 92 stops its operation. After step S208, retest transport unit 90 completes the processing.

When a passage instruction for passing transport-out part 92 is not given, in step S207, retest transport unit 90 causes the flow to proceed to NO, and executes step S209.

When post-measurement rack 60b is transported from bar code read unit 70 to subsequent-stage transport-in/transport-out unit 30 passing through retest transport unit 90, post-measurement rack 60b needs to be passed through transport-in part 93 of retest transport unit 90. In this case, control unit 50 transmits an instruction signal for instructing passage of transport-in part 93 to retest transport unit 90.

In step S209, retest transport unit 90 determines whether or not a passage instruction for passing transport-in part 93 is given. When a passage instruction is given, in step S209, retest transport unit 90 causes the flow to proceed to YES, and executes step S210. In step S210, retest transport unit 90 operates transport-in part 93, and causes post-measurement rack 60b sent from bar code read unit 70 to be passed through transport-in part 93. After post-measurement rack 60b is passed through, transport-in part 93 stops its operation. After step S210, retest transport unit 90 completes the processing.

In step S209, when a passage instruction to pass transport-in part 93 is not given, retest transport unit 90 completes the processing.

Figure 11:
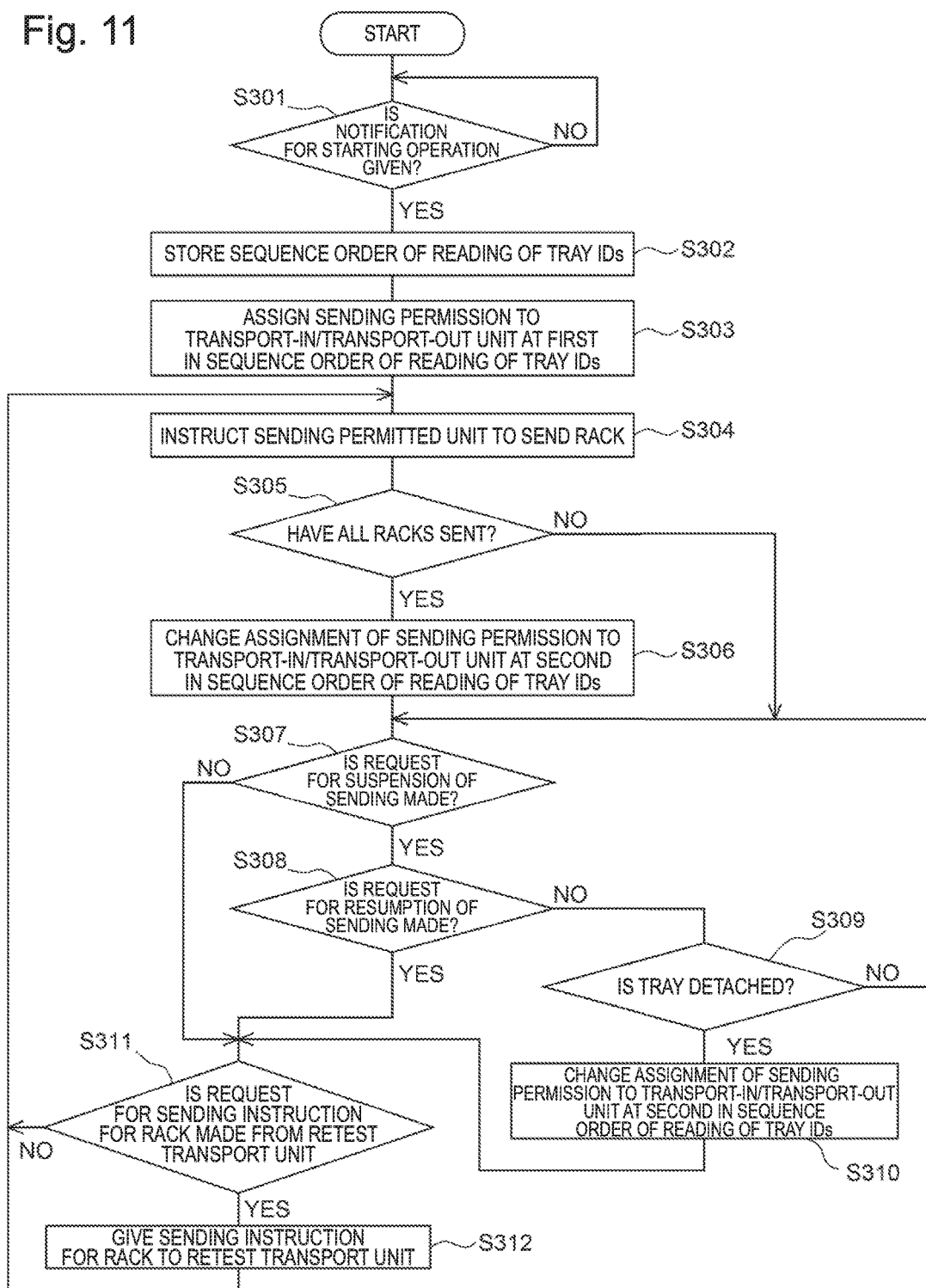
FIG. 11 is a flowchart illustrating steps of sending control processing performed by a control unit according to a first embodiment.

The sending control processing performed by control unit 50 is described with reference to FIG. 11. As described above, when start button 391 of transport-in/transport-out unit 30 is pressed, and the tray ID is read, transport-in/transport-out unit 30 transmits a notification signal for starting the operation to control unit 50. CPU 501 of control unit 50 determines whether or not the notification signal for starting the operation has been received in step S301.

When the notification signal for starting the operation has not been received, in step S301, CPU 501 causes the flow to proceed to NO, and repeats the processing in step S301. When the notification signal for starting the operation has been received, in step S301, CPU 501 causes the flow to proceed to YES, and executes the processing in step S302.

In step S302, CPU 501 stores, in hard disk 504, the sequence order of reception of notification signals for starting the operation of transport-in/transport-out units 30, in other words, the sequence order of reading of tray IDs.

Next, in step S303, CPU 501 assigns sending permission to transport-in/transport-out unit 30 at the first place in the sequence order of reading of tray IDs.

Figure 12A:
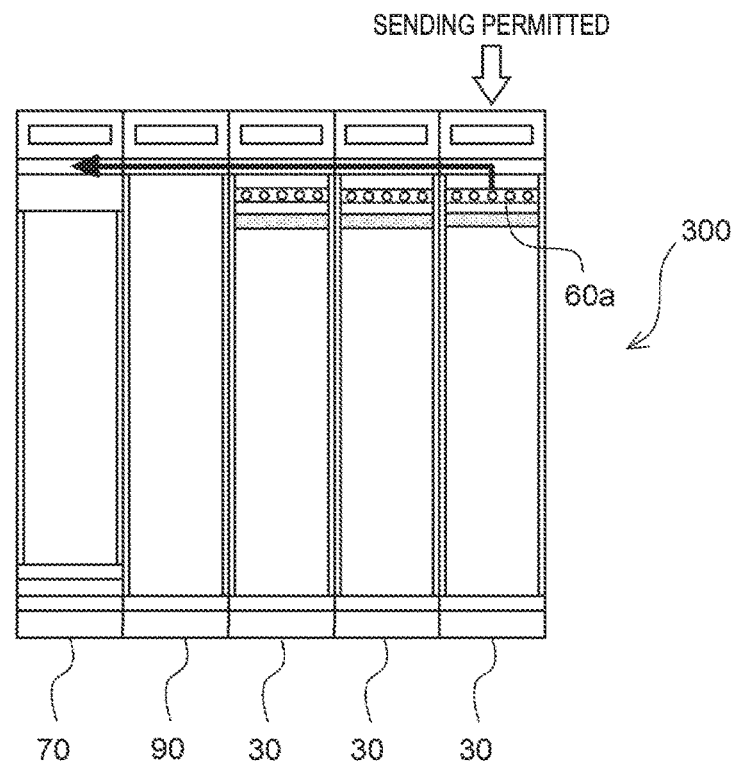
FIG. 12A is a diagram illustrating an operation of a rack transport-in/transport-out device.

The operation of rack transport-in/transport-out device 300 is described with reference to FIG. 12A. Transport-in/transport-out unit 30 illustrated at the right end in FIG. 12A is the first in the sequence of read tray IDs, transport-in/transport-out unit 30 illustrated second from the right in FIG. 12A is the second in the sequence of read tray IDs, and transport-in/transport-out unit 30 illustrated third from the right in FIG. 12A is the third in the sequence of read tray IDs. In this case, sending permission is assigned to transport-in/transport-out unit 30 illustrated at the right end in FIG. 12A.

FIG. 11 is referred to again. In step S304, CPU 501 transmits a sending instruction signal for pre-measurement rack 60*a* to transport-in/transport-out unit 30 (hereinafter referred to as "sending permitted unit") to which sending permission is assigned. Thus, sending permitted unit 30 transports out pre-measurement rack 60*a*.

In step S305, CPU 501 determines whether or not a notification signal of completion of sending has been received from sending permitted unit 30. When the notification signal of completion of sending has been received, pre-measurement rack 60*a* to be sent is not present. Therefore, when the notification signal of completion of sending has been received, in step S306, CPU 501 cancels the sending permission of sending permitted unit 30, and assigns sending permission to transport-in/transport-out unit 30 for the next in the sequence of read tray IDs. After step S306, CPU 501 executes the processing in step S307. In step S305, even when the notification signal of completion of sending has not been received, CPU 501 executes the processing in step S307.

In step S307, CPU 501 determines whether or not a request signal for suspension of sending has been received from sending permitted unit 30. When a request signal for suspension of sending has been received, in step S307, CPU 501 causes the flow to proceed to YES, and executes the processing in step S308. When a request signal for suspension of sending has not been received, in step S307, CPU 501 causes the flow to proceed to NO, and executes the processing in step S311.

In step S308, CPU 501 determines whether or not a request signal for resumption of sending has been received from sending permitted unit 30. When the request signal for resumption of sending has been received, in step S308, CPU 501 causes the flow to proceed to YES, and executes the processing in step S311. When the request signal for resumption of sending has not been received, in step S308, CPU 501 causes the flow to proceed to NO, and executes the processing in step S309.

In step S309, CPU 501 determines whether or not a notification signal of tray detachment has been received from sending permitted unit 30. When the notification signal of tray detachment has been received, in step S309, CPU 501 causes the flow to proceed to YES, and executes the processing in step S310. In step S310, CPU 501 cancels the sending permission of sending permitted unit 30, and assigns sending permission to transport-in/transport-out unit 30 for the next in the sequence of read tray IDs. After step S310, CPU 501 executes the processing in step S311. When the notification signal of tray detachment has not been received, in step S309, CPU 501 causes the flow to proceed to NO, and returns to the processing in step S307. Therefore, unless control unit 50 receives the request signal for resumption of sending or the notification signal of tray detachment, CPU 501 repeats the processing in steps S307 to S309, and does not transmit a transport instruction signal. Therefore, a transport instruction is not given to all of transport-in/transport-out units 30 and retest transport units 90, and sending of each rack 60 is suspended.

In step S311, CPU 501 determines whether or not a request signal for sending instruction has been received from retest transport unit 90. When a request signal for sending instruction has been received, in step S311, CPU 501 causes the flow to proceed to YES, and executes the processing in step S312. In step S312, CPU 501 transmits a sending instruction signal to retest transport unit 90. Thus, even when pre-measurement rack 60*a* remains in sending permitted unit 30, retest transport unit 90 transports out priority rack 60*c* or retest rack 60*d*. After step S312, CPU 501 returns to the processing in step S304. When a request signal for sending instruction has not been received retest transport unit 90, in step S311, CPU 501 causes the flow to proceed to NO, and returns to the processing in step S304.

By the sending control processing described above, sending permitted unit 30 continuously sends pre-measurement rack 60*a* until no pre-measurement rack 60*a* is left. Since sending permission is early assigned to transport-in/transport-out unit 30 for which tray ID is read early, measurement of samples can be made in a sequence desired by a user by reading the tray ID from tray 36 which includes pre-measurement rack 60*a* holding a sample to be measured earlier. Since sending permitted unit 30 continuously sends pre-measurement rack 60*a* until no pre-measurement rack 60*a* is left, it is easier for a user to predict a replacement time of tray 36.

Figure 12B:
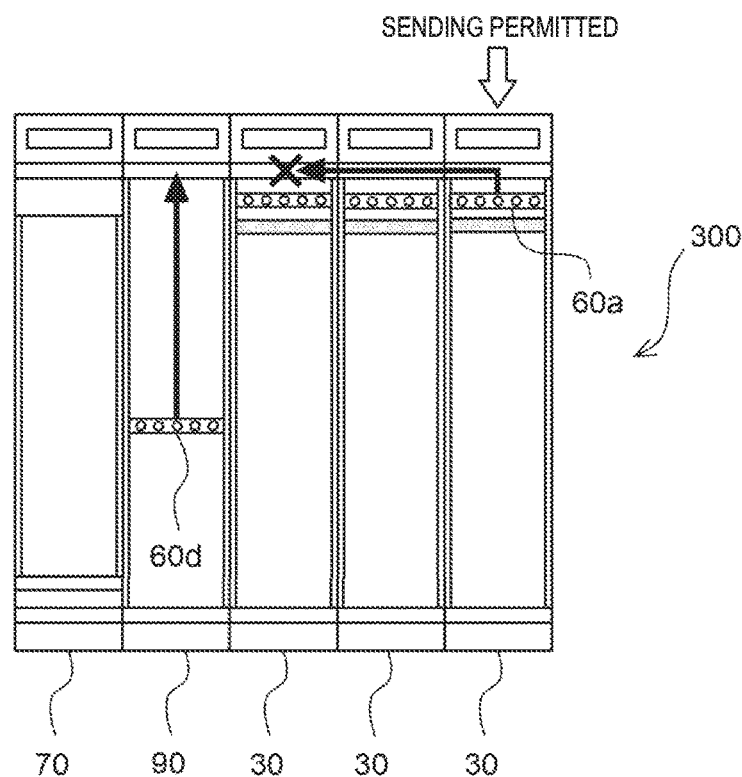
FIG. 12B is a diagram illustrating an operation of a rack transport-in/transport-out device.

As illustrated in FIG. 12B, when priority rack 60*c* or retest rack 60*d* is present in retest transport unit 90, even before all pre-measurement racks 60*a* are sent from sending permission unit 30, retest transport unit 90 sends priority rack 60*c* or retest rack 60*d*. Therefore, a sample to be measured preferentially can be promptly transported to the measurement unit 10.

Figure 12C:
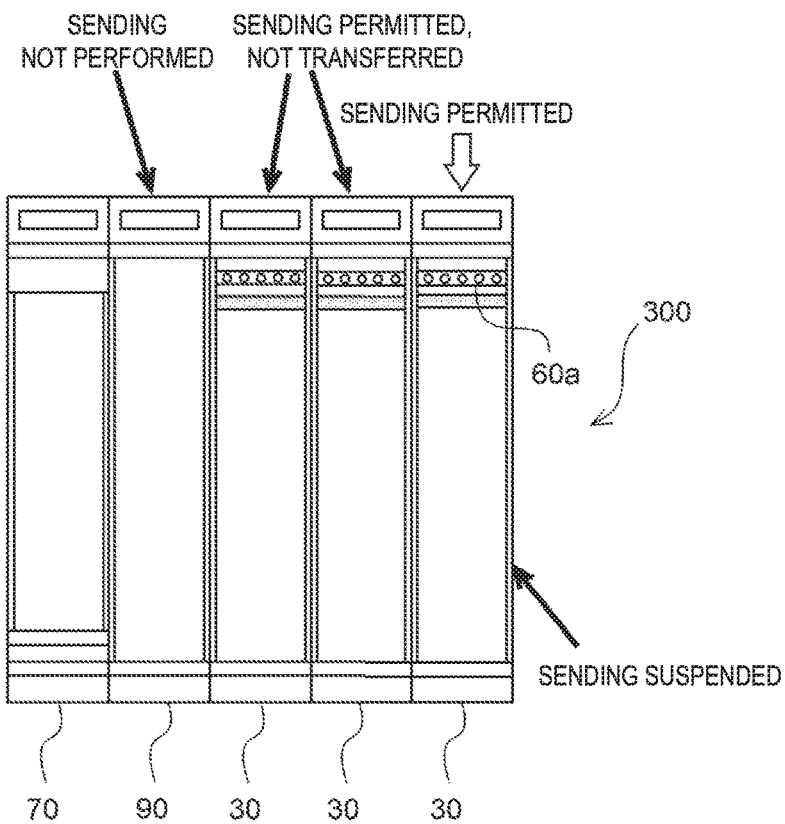
FIG. 12C is a diagram illustrating an operation of a rack transport-in/transport-out device.

As illustrated in FIG. 12C, when a user presses suspension button 392 in sending permitted unit 30, sending is suspended not only in sending permitted unit 30 but also in all transport-in/transport-out units 30 and retest transport units 90. When sending is resumed, sending permitted unit 30 before the suspension sending is not changed, thus pre-measurement rack 60*a* can be continuously sent from sending permitted unit 30, which makes it easier for a user to predict a replacement time of tray.

Figure 12D:
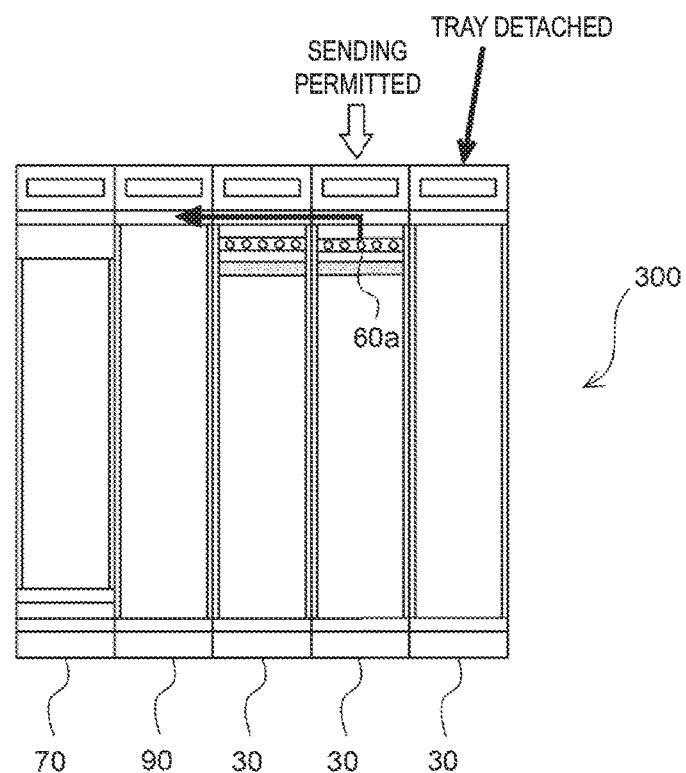
FIG. 12D is a diagram illustrating an operation of a rack transport-in/transport-out device.

As illustrated in FIG. 12D, when tray 36 is detached before all pre-measurement racks 60*a* are transported from sending permission unit 30, transport-in/transport-out unit 30 for the second in the sequence of read tray IDs is set to a target for sending, and sending of pre-measurement rack 60*a* is started. Therefore, when tray 36 is replaced, sending of pre-measurement rack 60*a* is resumed promptly, and samples can be measured efficiently.

Figure 13:
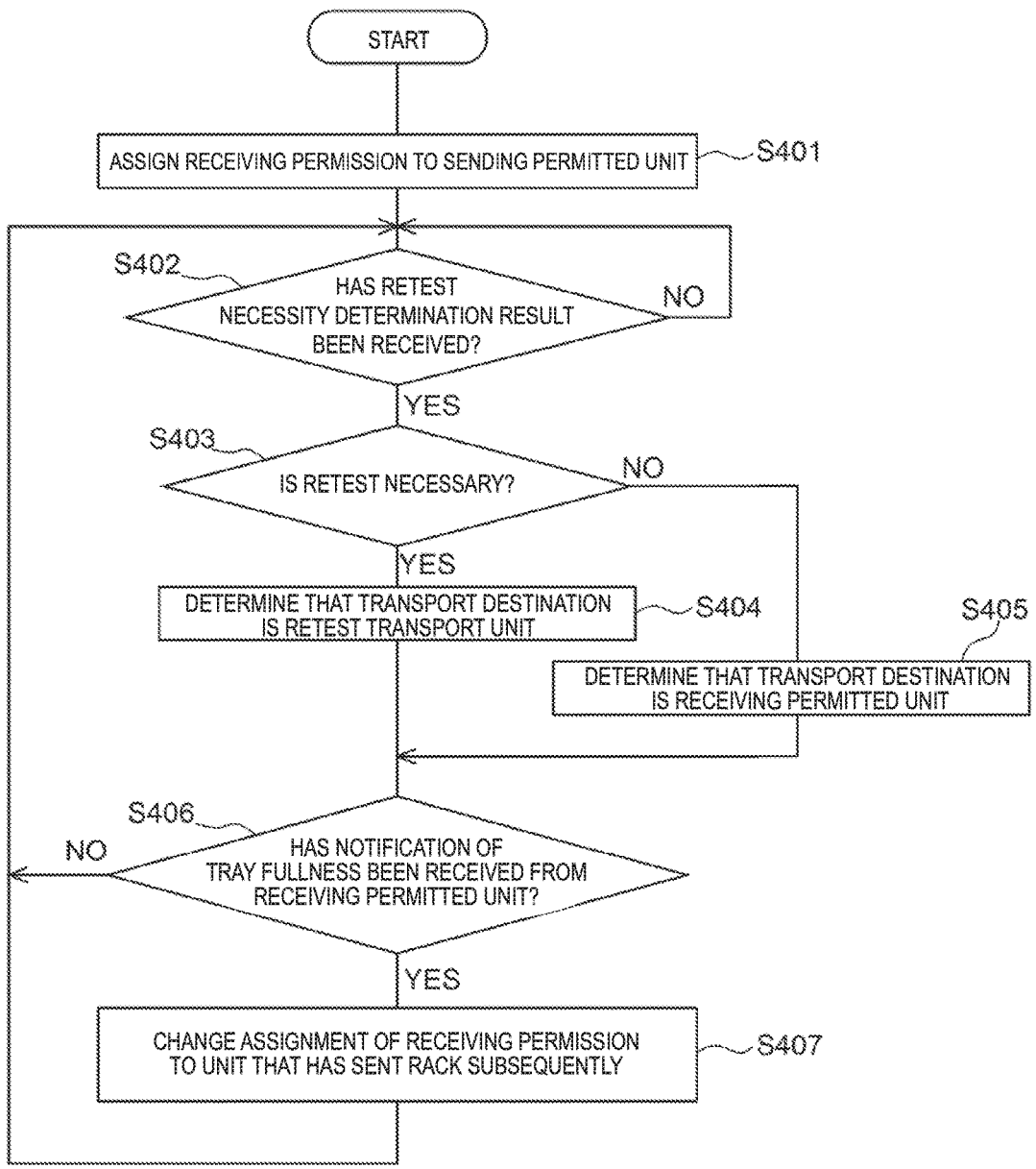
FIG. 13 is a flowchart illustrating steps of sending control processing performed by a control unit.

The receiving control processing of control unit 50 is described with reference to FIG. 13. In the receiving control processing, control unit 50 assigns receiving permission to transport-in/transport-out unit 30 that permits receiving of post-measurement rack 60*b*.

When receiving permission has not been assigned to any transport-in/transport-out unit 30, in other words, when receiving permission is assigned for the first time, in step S401, CPU 501 assigns receiving permission to sending permitted unit 30. Thus, receiving permission is assigned earlier to transport-in/transport-out unit 30 that has sent pre-measurement rack 60*a* earlier. Hereinafter, transport-in/ transport-out unit 30 to which receiving permission is assigned is referred to as "receiving permitted unit".

In step S402, CPU 501 determines whether or not a determination result as to necessity of retest has been received from measurement unit 10 or host computer 80. When the determination result as to necessity of retest has been received, in step S402, CPU 501 causes the flow to proceed to YES, and executes the processing in step S403. When the determination result as to necessity of retest has not been received, in step S402, CPU 501 causes the flow to proceed to NO, and repeats the processing in step S402. Thus, CPU 501 stays in standby until the determination result as to necessity of retest is received.

In step S403, CPU 501 determines whether retest is necessary. When retest is necessary, in step S403, CPU 501 causes the flow to proceed to YES, and executes the processing in step S404. When retest is unnecessary, in step S403, CPU 501 causes the flow to proceed to NO, and executes the processing in step S405.

In step S404, CPU 501 determines that the transport destination is retest transport unit 90, and transmits a receiving instruction signal to retest transport unit 90, a transport instruction signal to transport unit 20, and a passage instruction signal to bar code read unit 70. Consequently, retest rack 60d is transported to retest transport unit 90. After step S404, CPU 501 executes the processing in step S406.

In step S405, CPU 501 determines that the transport destination is receiving permitted unit 30, and transmits a receiving instruction signal to receiving permitted unit 30, a transport instruction signal to transport unit 20, and a passage instruction signal to bar code read unit 70, retest transport unit 90, and transport-in/transport-out unit 30 other than receiving permitted unit 30. Thus, post-measurement rack 60b is transported to receiving permitted unit 30. After step S405, CPU 501 executes the processing in step S406.

In step S406, CPU 501 determines whether or not a notification of tray fullness has been received from receiving permitted unit 30. When the notification of tray fullness has been received, there is no space in the tray. Therefore, it is not possible for receiving permitted unit 30 to receive a rack. When the notification of tray fullness has not been received, sending permitted unit 30 sends pre-measurement rack 60a, and thus there is space in the tray. Therefore, it is possible for receiving permitted unit 30 to receive a rack.

When the notification of tray fullness has been received, in step S406, CPU 501 causes the flow to proceed to YES, and executes the processing in step S407. In step S407, CPU 501 newly assigns receiving permission to transport-in/transport-out unit 30 that has sent pre-measurement rack 60a subsequent to receiving permitted unit 30, and cancels the receiving permission to the previous receiving permitted unit 30. Since new receiving permitted unit 30 has sent pre-measurement rack 60a, there is space in the tray. Therefore, it is possible for the new receiving permitted unit 30 to receive a rack. After step S406, CPU 501 returns to the processing in step S402.

When the notification of tray fullness has not been received, in step S406, CPU 501 causes the flow to proceed to NO, and returns to the processing in step S402. Thus, post-measurement rack 60b is continuously transported to receiving permitted unit 30 in the same manner as before.

Based on the receiving control processing described above, sending permitted unit 30 that has sent pre-measurement rack 60a earlier receives post-measurement rack 60b earlier, and thus, it is possible for transport-in/transport-out unit 30 with space in the tray to receive post-measurement rack 60b. Therefore, execution of sending and receiving of racks using a single transport-in/transport-out unit 30 can reduce the installation area of the system, and sending and receiving of racks may be made by using a limited area efficiently.

Assignment of sending permission and assignment of receiving permission are not made at the same time. It takes time for transport of rack 60, thus even when sending permitted unit 30 has sent all pre-measurement racks 60a, tray 36 of sending permitted unit 30 has space. Therefore, even when sending permitted unit 30 is changed, receiving permitted unit 30 is not changed, and post-measurement rack 60b can be received in the same manner as before.

Also, receiving permitted unit 30 is not changed until tray 36 becomes full. Therefore, post-measurement rack 60b can be continuously transported to receiving permitted unit 30. For this reason, it is easier for a user to predict a replacement time of tray 36.

Second Embodiment

Figure 14:
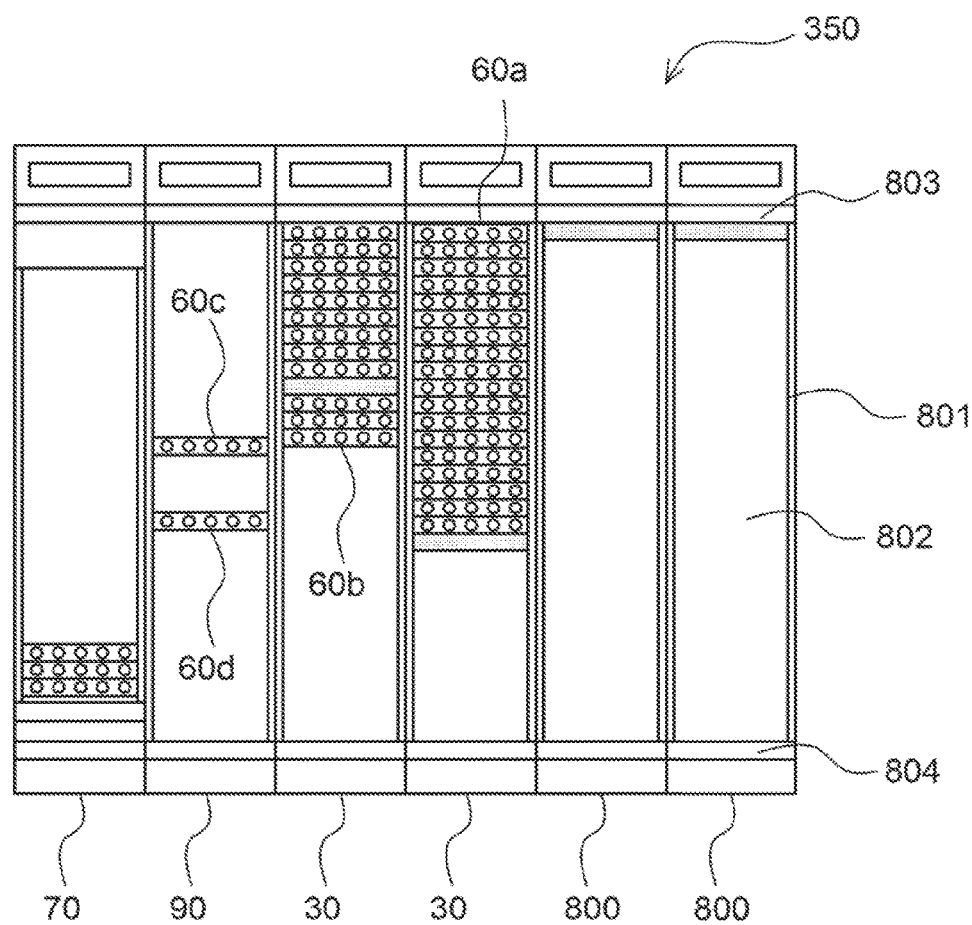
FIG. 14 is a diagram illustrating the configuration of a rack transport-in/transport-out device according to a second embodiment.

The configuration of a sample measurement system is described with reference to FIG. 14. The sample measurement system includes a rack transport-in/transport-out device 350. Rack transport-in/transport-out device 350 includes multiple transport-in/transport-out units 30, multiple dedicated transport-in units 800, one bar code read unit 70, and one retest transport unit 90.

Multiple dedicated transport-in units 800 have the same configuration as the configuration of transport-in/transport-out unit 30. That is, each dedicated transport-in unit 800 includes setting part 802 to which tray 801 is detachably attached, transport-out part 803, and transport-in part 804. However, pre-measurement rack 60a is not set in tray 801 of dedicated transport-in unit 800. Empty tray 801 is mounted to dedicated transport-in unit 800. The configuration of dedicated transport-in unit 800 may be different from the configuration of transport-in/transport-out unit 30, and a tray may not be detachably attached to dedicated transport-in unit 800.

Control unit 50 can set a receiving condition of each dedicated transport-in unit 800 for rack 60. A user can set a receiving condition according to a measurement status of a sample held in the rack. For instance, a user may set an error in reading a sample bar code or a rack bar code (hereinafter referred to as "read error") as a receiving condition, or may set failed measurement as a receiving condition (hereinafter referred to as "not measured"), in which measurement is not made normally due to abnormality of a measurement unit. It is also possible for control unit 50 not to set an receiving condition.

Other configurations of the sample measurement system are the same as those in the first embodiment, thus the same components are labeled with the same symbol, and a description is omitted.

Next, the operation of the sample measurement system is described. The operations other than the receiving control processing of control unit 50 are the same as those in the first embodiment. Thus, only the receiving control processing is described herein, and a description of other operations is omitted.

Figure 15:
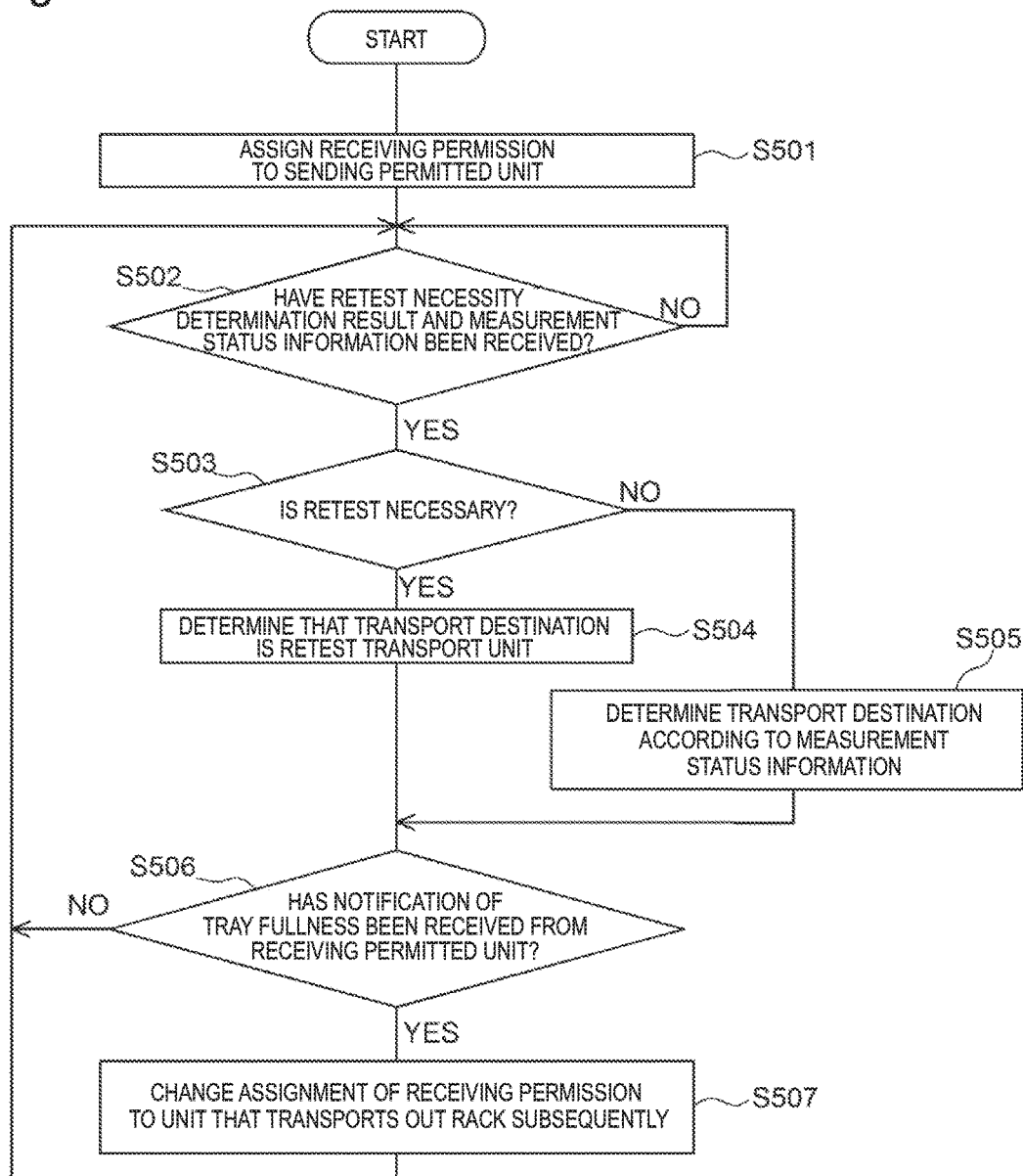
FIG. 15 is a flowchart illustrating steps of sending control processing performed by a control unit according to a second embodiment.

The transport control processing of control unit 50 is described with reference to FIG. 15.

In step S502, CPU 501 determines whether or not a determination result as to necessity of retest and measurement status information have been received from measurement unit 10 or host computer 80 and bar code read unit 70. The measurement status information includes "read error" and "not measured".

When a determination result as to necessity of retest and measurement status information have been received, in step S502, CPU 501 causes the flow to proceed to YES, and executes the processing in step S503. When a determination result as to necessity of retest and measurement status information have not been received, in step S502, CPU 501 causes the flow to proceed to NO, and repeats the processing in step S502. Thus, CPU 501 stays in standby until a determination result as to necessity of retest and measurement status information are received.

In step S505, CPU 501 determines the transport destination of post-measurement rack 60b according to the measurement status information. CPU 501 determines that dedicated transport-in unit 800 with a receiving condition set is the transport destination of post-measurement rack 60b in which measurement status information meets the receiving condition. For instance, the transport destination of post-measurement rack 60b holding a sample of "not measured" is dedicated transport-in unit 800 with "not measured" set as a receiving condition, and the transport destination of post-measurement rack 60b holding a sample of "read error" is dedicated transport-in unit 800 with "read error" set as a receiving condition. For post-measurement rack 60b holding respective samples of "not measured" and "read error", dedicated transport-in unit 800 with a priority is set in advance, and CPU 501 determines that dedicated transport-in unit 800 with a priority is the transport destination.

When a receiving condition is not set in some dedicated transport-in units 800, CPU 501 determines that those units 800 serve as the transport destination of post-measurement rack 60b in which measurement status information does not meet the receiving condition. Although transport-in/transport-out unit 30 is also a transport destination of post-measurement rack 60b in which measurement status information does not meet the receiving condition, CPU 501 determines dedicated transport-in unit 800 to be a transport destination with a priority.

CPU 501 determines a receiving destination based on the rule described above. However, the rule for determining a receiving destination is not limited to the above-described rule.

Other operations of control unit 50 in the receiving control processing are the same as those in the first embodiment, thus a description is omitted.

Based on the receiving control processing described above, post-measurement rack 60b in which measurement status information meets a receiving condition is received dedicated transport-in unit 800 with the receiving condition set. Therefore, it is possible to separately collect post-measurement rack 60b holding a sample of "not measured" and post-measurement rack 60b holding a sample of "read error".

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A sample measurement system comprising:
    a measurement unit that measures a sample stored in a sample container;
    a transport unit that transports a rack capable of holding sample containers via the measurement unit;
    a first transport-in/transport-out unit and a second transport-in/transport-out unit each comprising a setting part comprising a flat surface on which racks are capable of being set alongside in a first direction, and each sending the set racks to be transported to the measurement unit by the transport unit and receive the racks transported from the measurement unit by the transport unit; and
    a controller that controls the first transport-in/transport-out unit and the second transport-in/transport-out unit so that the racks are sequentially sent from the first transport-in/transport-out unit and the second transport-in/transport-out unit,
    wherein the first transport-in/transport-out unit and the second transport-in/transport-out unit are disposed alongside in a second direction crossing the first direction, and each send the racks out of the setting part from one end of two ends of the setting part in the first direction, and receive the racks into the setting part from the other end of the two ends of the setting part in the first direction.

2. The sample measurement system according to claim 1, wherein the controller controls the first transport-in/transport-out unit and the second transport-in/transport-out unit so that:
    after the first transport-in/transport-out unit completes sending the racks set therein, the second transport-in/transport-out unit starts sending the racks set therein; and
    the first transport-in/transport-out unit receives the racks first and then the second transport-in/transport-out unit receives the racks.

3. The sample measurement system according to claim 2, wherein
    each of the first transport-in/transport-out unit and the second transport-in/transport-out unit is configured so that a tray in which the racks are set is detachably attachable to each of the first transport-in/transport-out unit and the second transport-in/transport-out unit,
    each of the first transport-in/transport-out unit and the second transport-in/transport-out unit comprises an identification information acquirer that acquires identification information for identifying the tray, and
    the controller causes the first transport-in/transport-out unit and the second transport-in/transport-out unit to send the racks in an order of the identification information, acquired by the identification information acquirers, of the trays attached to the first transport-in/transport-out unit and the second transport-in/transport-out unit.

4. The sample measurement system according to claim 3, wherein the identification information acquirers acquire the identification information from the trays attached to the first transport-in/transport-out unit and the second transport-in/transport-out unit.

5. The sample measurement system according to claim 2, wherein
    each of the first transport-in/transport-out unit and the second transport-in/transport-out unit comprises a start instruction section that receives a start instruction to start sending the racks, and the controller causes the first transport-in/transport-out unit and the second transport-in/transport-out unit to send the racks in an order of the start instructions received by the start instruction sections.

6. The sample measurement system according to claim 5, wherein each of the first transport-in/transport-out unit and the second transport-in/transport-out unit further comprises a suspension instruction section that receives a suspension instruction to suspend a sending operation of the set racks, and in a condition in which the suspension instruction section of the first transport-in/transport-out unit performing the sending operation of the racks receives the suspension instruction, the controller causes the first transport-in/transport-out unit to suspend the sending operation of the racks while the first transport-in/transport-out unit continues receiving the racks transported from the measurement unit.

7. The sample measurement system according to claim 6, wherein each of the first transport-in/transport-out unit and the second transport-in/transport-out unit is configured such that a tray in which the racks are set is detachably attachable to each of the first transport-in/transport-out unit and the second transport-in/transport-out unit, and in a condition in which the tray is detached from the first transport-in/transport-out unit while the first transport-in/transport-out unit suspends sending the racks, the controller causes the second transport-in/transport-out unit to start sending of a rack.

8. The sample measurement system according to claim 6, further comprising a priority transport unit in which a priority rack holding a sample container that stores a sample to be preferentially measured by the measurement unit is capable of being set, and which sends the priority rack set to be transported to the measurement unit by the transport unit, wherein in a condition in which the priority rack is set in the priority transport unit before the first transport-in/transport-out unit and the second transport-in/transport-out unit complete sending a rack to be sent, the controller causes the first transport-in/transport-out unit and the second transport-in/transport-out unit to stay on standby for sending the rack to be sent until the priority transport unit sends the priority rack.

9. The sample measurement system according to claim 8, wherein the sample to be preferentially measured by the measurement unit comprises a sample to be re-measured by the measurement unit, and the controller causes the priority transport unit to receive the priority rack transported from the measurement unit by the transport unit, and to send the received priority rack.

10. The sample measurement system according to claim 1, further comprising a dedicated transport-in unit that receives racks transported from the measurement unit by the transport unit and does not send any racks, wherein the controller is capable of setting a receiving condition for a rack to be received by the dedicated transport-in unit, and the controller determines the dedicated transport-in unit as a receiving destination of a rack meeting the receiving condition among the racks transported from the measurement unit by the transport unit, and determines any of the first transport-in/transport-out unit and the second transport-in/transport-out unit as a receiving destination of a rack not meeting the receiving condition among the racks.

* * * * *